US012737924B2

(12) United States Patent
Zhang et al.

(10) Patent No.: US 12,737,924 B2
(45) Date of Patent: Sep. 15, 2026

(54) POINT CLOUD ATTRIBUTE CODING METHOD, POINT CLOUD ATTRIBUTE DECODING METHOD, AND TERMINAL

(71) Applicant: VIVO MOBILE COMMUNICATION CO., LTD., Guangdong (CN)

(72) Inventors: Wei Zhang, Guangdong (CN); Jingyun Lu, Guangdong (CN); Zhuoyi Lv, Guangdong (CN); Fuzheng Yang, Guangdong (CN); Na Dai, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 247 days.

(21) Appl. No.: 18/439,292

(22) Filed: Feb. 12, 2024

(65) Prior Publication Data

US 2024/0185468 A1 Jun. 6, 2024

Related U.S. Application Data

(63) Continuation of application No. PCT/CN2022/113267, filed on Aug. 18, 2022.

(30) Foreign Application Priority Data

Aug. 23, 2021 (CN) ......................... 202110970524.3

(51) Int. Cl.

*G06T 9/00* (2006.01)
*G06F 5/01* (2006.01)
*G06F 7/24* (2006.01)

(52) U.S. Cl.

CPC ................ *G06T 9/001* (2013.01); *G06F 5/01* (2013.01); *G06F 7/24* (2013.01)

(58) Field of Classification Search

None

See application file for complete search history.

(56) References Cited

U.S. PATENT DOCUMENTS

2017/0214943 A1* 7/2017 Cohen .................. H04N 19/625
2022/0124374 A1* 4/2022 Zhang .................... H04N 19/70
(Continued)

FOREIGN PATENT DOCUMENTS

WO 2021062732 A1 4/2021

OTHER PUBLICATIONS

International Organisation for Standardisation, ISO/IEC JTC1/SC29/WG11; Coding of Moving Pictures and Audio, "G-PCC codec description v8", N19525, Jul. 2020, Online.

*Primary Examiner* — Leon Flores

(74) *Attorney, Agent, or Firm* — Perilla Knox & Hildebrandt; Kenneth A. Knox

(57) ABSTRACT

A point cloud attribute coding method, a point cloud attribute decoding method, and a terminal are provided. The point cloud attribute coding method includes: obtaining a to-be-coded point cloud; partitioning the to-be-coded point cloud into at least one to-be-coded point cloud block based on the number of to-be-coded points included in the to-be-coded point cloud, volume information of a bounding box corresponding to the to-be-coded point cloud, and an order of each to-be-coded point; for each to-be-coded point cloud block including at least two to-be-coded points, partitioning the to-be-coded point cloud block into N to-be-coded point cloud groups based on the number of to-be-coded points included in the to-be-coded point cloud block and a preset maximum transform order; performing transform coding and quantization processing on first residual information corresponding to a first target to-be-coded point cloud group, to obtain a quantized first transform coefficient.

20 Claims, 8 Drawing Sheets

(56) References Cited

U.S. PATENT DOCUMENTS

| | | | |
|---|---|---|---|
| 2022/0207781 | A1 | 6/2022 | Zhang et al. |
| 2023/0419554 | A1 * | 12/2023 | Chen ....................... G06T 9/001 |

* cited by examiner

POINT CLOUD ATTRIBUTE CODING METHOD, POINT CLOUD ATTRIBUTE DECODING METHOD, AND TERMINAL

CROSS-REFERENCE TO RELATED APPLICATIONS

This application is a continuation application of PCT International Application No. PCT/CN2022/113267 filed on Aug. 18, 2022, which claims priority to Chinese Patent Application No. 202110970524.3, filed in China on Aug. 23, 2021, the disclosures of which are incorporated herein by reference in their entireties.

TECHNICAL FIELD

This application pertains to the field of point cloud processing technologies, and specifically relates to a point cloud attribute coding method, a point cloud attribute decoding method, and a terminal.

BACKGROUND

A point cloud is a set of discrete points irregularly distributed in space that represent a spatial structure and surface attributes of a three-dimensional object or scene.

Attribute coding of a point cloud is partitioned into attribute prediction coding and attribute transform coding. In the attribute prediction coding process, after residual information corresponding to each to-be-coded point is obtained, the residual information is quantized and entropy coded to obtain a binary code stream. In the attribute transform coding process, after residual information corresponding to each to-be-coded point is obtained, the residual information is transformed by using a fixed-order matrix to obtain a transform coefficient.

In both the above attribute prediction coding and attribute transform coding processes, a correlation between corresponding residual information of to-be-coded points is not considered, resulting in presence of redundant information in the residual information and the transform coefficient, which reduces the attribute coding efficiency of the point cloud. In addition, an attribute decoding process of the point cloud is consistent with the attribute coding process of the point cloud, which also reduces the attribute decoding efficiency of the point cloud.

SUMMARY

Embodiments of this application provide a point cloud attribute coding method, a point cloud attribute decoding method, and a terminal.

According to a first aspect, a point cloud attribute coding method is provided, where the method includes:

obtaining a to-be-coded point cloud, where to-be-coded points in the to-be-coded point cloud are sorted in a preset coding order;

partitioning the to-be-coded point cloud into at least one to-be-coded point cloud block based on the number of to-be-coded points included in the to-be-coded point cloud, volume information of a bounding box corresponding to the to-be-coded point cloud, and an order of each to-be-coded point;

for each to-be-coded point cloud block including at least two to-be-coded points, partitioning the to-be-coded point cloud block into N to-be-coded point cloud groups based on the number of to-be-coded points included in the to-be-coded point cloud block and a preset maximum transform order, N being a positive integer;

performing transform coding and quantization processing on first residual information corresponding to a first target to-be-coded point cloud group, to obtain a quantized first transform coefficient; where the first target to-be-coded point cloud group is at least part of the N to-be-coded point cloud groups and the first target to-be-coded point cloud group is a to-be-coded point cloud group for which transform coding is performed; and performing entropy coding on the quantized first transform coefficient and second residual information corresponding to a second target to-be-coded point cloud group to generate a target code stream; where the second target to-be-coded point cloud group is a to-be-coded point cloud group in the N to-be-coded point cloud groups other than the first target to-be-coded point cloud group.

According to a second aspect, a point cloud attribute decoding method is provided, where the method includes:

decoding a to-be-decoded code stream to obtain a to-be-decoded point cloud, where to-be-decoded points in the to-be-decoded point cloud are sorted in a preset coding order;

partitioning the to-be-decoded point cloud into at least one to-be-decoded point cloud block based on the number of to-be-decoded points included in the to-be-decoded point cloud, volume information of a bounding box corresponding to the to-be-decoded point cloud, and an order of each to-be-decoded point;

for each to-be-decoded point cloud block including at least two to-be-decoded points, partitioning the to-be-decoded point cloud block into M to-be-decoded point cloud groups based on the number of to-be-decoded points included in the to-be-decoded point cloud block and a preset maximum transform order, M being a positive integer;

performing inverse quantization processing on a second transform coefficient corresponding to a third target to-be-decoded point cloud group, to obtain a target high-frequency coefficient and a target low-frequency coefficient; where the third target to-be-decoded point cloud group is at least part of the M to-be-decoded point cloud groups and the third target to-be-decoded point cloud group is a to-be-decoded point cloud group for which inverse quantization processing is performed; and performing inverse transform processing on the target high-frequency coefficient and the target low-frequency coefficient to obtain third residual information corresponding to the third target to-be-decoded point cloud group.

According to a third aspect, an encoder is provided, including:

a first obtaining module, configured to obtain a to-be-coded point cloud, where to-be-coded points in the to-be-coded point cloud are sorted in a preset coding order;

a first partitioning module, configured to partition the to-be-coded point cloud into at least one to-be-coded point cloud block based on the number of to-be-coded points included in the to-be-coded point cloud, volume information of a bounding box corresponding to the to-be-coded point cloud, and an order of each to-be-coded point;

- a second partitioning module, configured to: for each to-be-coded point cloud block including at least two to-be-coded points, partition the to-be-coded point cloud block into N to-be-coded point cloud groups based on the number of to-be-coded points included in the to-be-coded point cloud block and a preset maximum transform order, N being a positive integer;
- a first coding module, configured to: perform transform coding and quantization processing on first residual information corresponding to a first target to-be-coded point cloud group, to obtain a quantized first transform coefficient; where the first target to-be-coded point cloud group is at least part of the N to-be-coded point cloud groups and the first target to-be-coded point cloud group is a to-be-coded point cloud group for which transform coding is performed; and
- a second coding module, configured to: perform entropy coding on the quantized first transform coefficient and second residual information corresponding to a second target to-be-coded point cloud group to generate a target code stream; where the second target to-be-coded point cloud group is a to-be-coded point cloud group in the N to-be-coded point cloud groups other than the first target to-be-coded point cloud group.

According to a fourth aspect, a decoder is provided, including:

- a decoding module, configured to: decode a to-be-decoded code stream to obtain a to-be-decoded point cloud, where to-be-decoded points in the to-be-decoded point cloud are sorted in a preset coding order;
- a third partitioning module, configured to partition the to-be-decoded point cloud into at least one to-be-decoded point cloud block based on the number of to-be-decoded points included in the to-be-decoded point cloud, volume information of a bounding box corresponding to the to-be-decoded point cloud, and an order of each to-be-decoded point;
- a fourth partitioning module, configured to: for each to-be-decoded point cloud block including at least two to-be-decoded points, partition the to-be-decoded point cloud block into M to-be-decoded point cloud groups based on the number of to-be-decoded points included in the to-be-decoded point cloud block and a preset maximum transform order, M being a positive integer;
- an inverse quantization module, configured to perform inverse quantization processing on a second transform coefficient corresponding to a third target to-be-decoded point cloud group, to obtain a target high-frequency coefficient and a target low-frequency coefficient; where the target to-be-decoded point cloud group is at least part of the M to-be-decoded point cloud groups and the third target to-be-decoded point cloud group is a to-be-decoded point cloud group for which inverse quantization processing is performed; and
- an inverse transform module, configured to perform inverse transform processing on the target high-frequency coefficient and the target low-frequency coefficient to obtain third residual information corresponding to the third target to-be-decoded point cloud group.

According to a fifth aspect, a terminal is provided, where the terminal includes a processor, a memory, and a program or instructions stored in the memory and capable of running on the processor, and when the program or the instructions are executed by the processor, the steps of the point cloud attribute coding method according to the first aspect are implemented, or the steps of the point cloud attribute decoding method according to the second aspect are implemented.

According to a sixth aspect, a readable storage medium is provided, where a program or instructions are stored in the readable storage medium, and when the program or the instructions are executed by a processor, the steps of the point cloud attribute coding method according to the first aspect are implemented, or the steps of the point cloud attribute decoding method according to the second aspect are implemented.

According to a seventh aspect, a chip is provided, where the chip includes a processor and a communication interface, the communication interface is coupled to the processor, and the processor is configured to run a program or instructions to implement the steps of the point cloud attribute coding method according to the first aspect or the steps of the point cloud attribute decoding method according to the second aspect.

According to an eighth aspect, a computer program/program product is provided, where the computer program/program product is stored in a non-volatile storage medium, and the computer program/program product is executed by at least one processor to implement the steps of the point cloud attribute coding method according to the first aspect or the steps of the point cloud attribute decoding method according to the second aspect.

According to a ninth aspect, a communication device is provided, configured to execute the steps of the point cloud attribute coding method according to the first aspect or the steps of the point cloud attribute decoding method according to the second aspect.

In the embodiments of this application, after the to-be-coded point cloud is obtained, the to-be-coded point cloud is partitioned into at least one to-be-coded point cloud block, and point cloud grouping is performed on the to-be-coded points in each to-be-coded point cloud block to partition the to-be-coded point cloud block into N to-be-coded point cloud groups. In the transform coding process, the correlation between the corresponding residual information of the to-be-coded points is fully considered, and transform coding and quantization processing are performed on the first residual information corresponding to the first target to-be-coded point cloud group to obtain the quantized first transform coefficient, where a correlation is present between the residual information of the to-be-coded points in the first target to-be-coded point cloud group. Further, entropy coding is performed on the quantized first transform coefficient and the second residual information corresponding to the second target to-be-coded point cloud group to generate the target code stream.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "/" generally indicates that the associated objects are in an "or" relationship.

An encoder corresponding to the point cloud attribute coding method and a decoder corresponding to the point cloud attribute decoding method in the embodiments of this application may be a terminal. The terminal may also be referred to as a terminal device or user equipment (UE), and the terminal may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a specific type of the terminal is not limited in the embodiments of this application.

For ease of understanding, the following describes some content included in the embodiments of this application.

Figure 1:
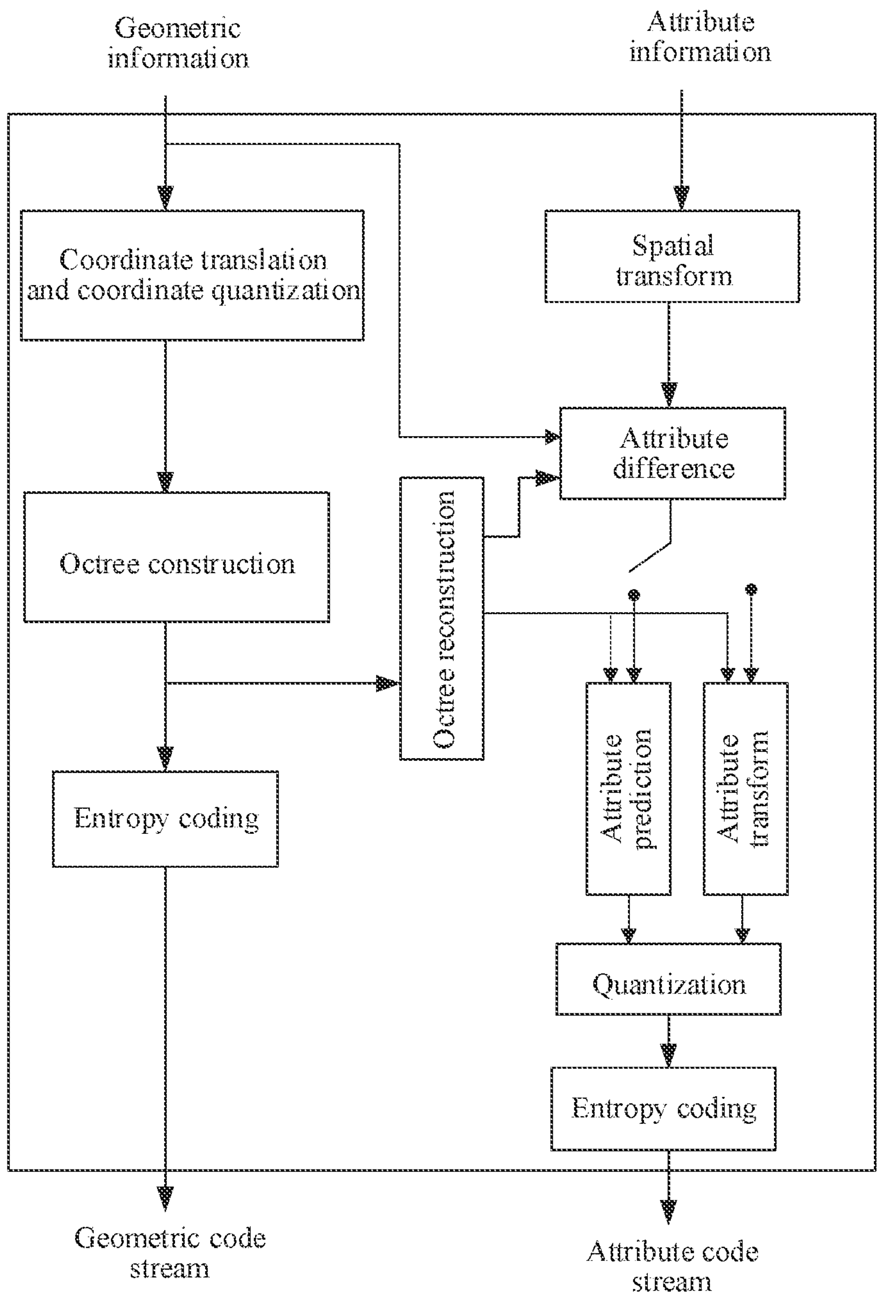
FIG. 1 is a schematic diagram of a point cloud AVS encoder framework.

Referring to FIG. 1, as shown in FIG. 1, currently, in digital audio video codec technology standards, geometric information and attribute information of a point cloud are coded separately using a point cloud audio video coding standard (AVS) encoder. First, coordinate transform is performed on the geometric information so that the point cloud is all included in one bounding box, and then coordinate quantization is performed. The quantization mainly plays the role of scaling; and due to rounding of geometric coordinates during quantization, some points may have the same geometric information, which are also referred to as duplicate points. Whether to remove the duplicate points is determined based on parameters. The two steps, namely quantization and removal of duplicate points, are also referred to as the process of voxelization. Next, the bounding box is partitioned into a multinomial tree, such as an octree, a quadtree, or a binary tree. In the multinomial tree-based geometric information coding framework, the bounding box is equally partitioned into eight sub-cubes. Non-empty sub-cubes are further divided until leaf nodes obtained through division reach 1×1×1 unit cubes. Then, points in the leaf nodes are coded to generate a binary code stream.

In the multinomial tree-based geometric coding of the point cloud, for to-be-coded points, occupancy information of the neighboring nodes needs to be stored, so as to perform prediction coding on occupancy information of the to-be-coded points; as a result, a large amount of occupancy information needs to be stored for to-be-coded points close to the leaf nodes, occupying a large amount of memory space.

After geometric coding is completed, the geometric information is reconstructed for subsequent recoloring. Attribute coding is mainly for color and reflectance information. First, it is determined, based on parameters, whether to perform color space conversion; if color space conversion is to be performed, color information is converted from the red green blue (RGB) color space to the luminance and chrominance (YUV) color space. Then, the geometrically reconstructed point cloud is recolored using the original point cloud, aligning uncoded attribute information with reconstructed geometric information. In color information coding, after sorting is performed on the point cloud using a Morton code or a Hilbert code, nearest neighbors of a to-be-predicted point are searched based on a geometric spatial relation, reconstructed attribute values for neighbors found are used to perform prediction on the to-be-predicted point to obtain a predicted attribute value, differential prediction is performed on a true attribute value and the predicted attribute value to obtain a predicted residual, and finally the predicted residual is quantized and coded to generate a binary code stream.

Figure 2:
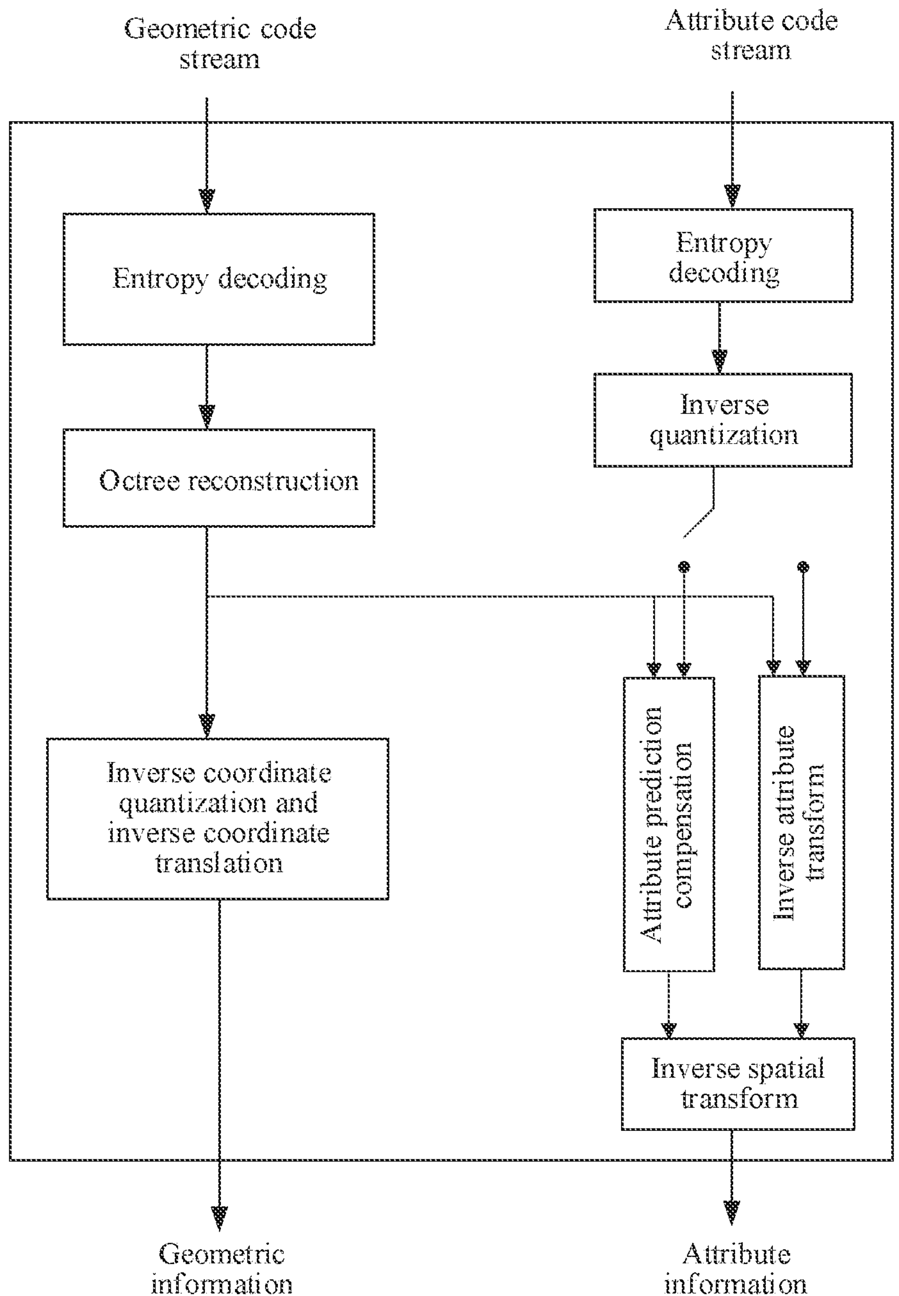
FIG. 2 is a schematic diagram of a point cloud AVS decoder framework.

It should be understood that the decoding process in the digital audio video decoding technology standards corresponds to the coding process described above, and specifically the AVS decoder framework is shown in FIG. 2.

Figure 3:
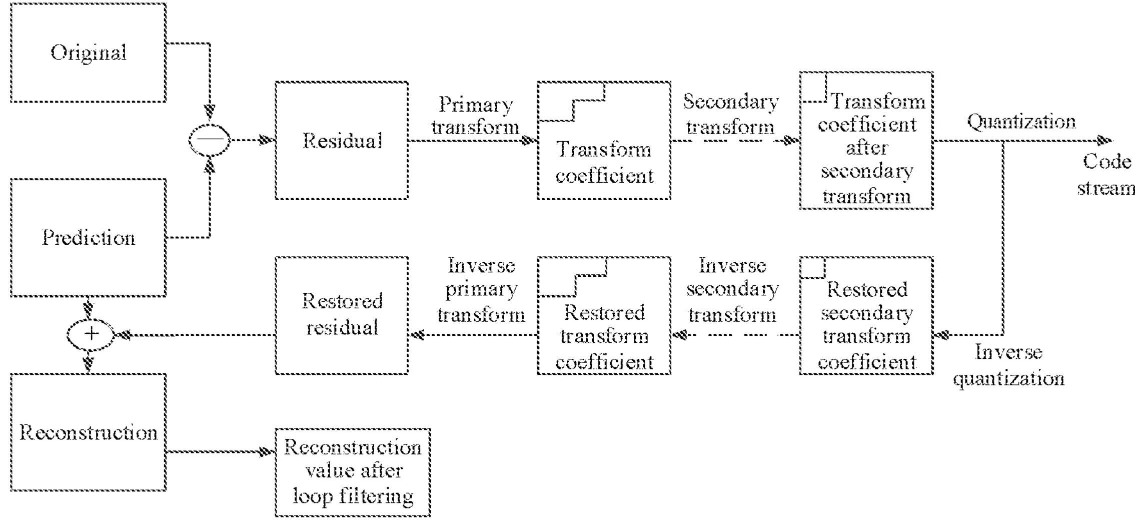
FIG. 3 is a flowchart of point cloud attribute coding in the prior art.

Referring to FIG. 3, FIG. 3 is a flowchart of point cloud attribute coding in the prior art. Point cloud attribute coding is implemented in the following manner in the prior art:

First, a prediction residual is obtained by subtracting a prediction signal from an original signal, which is also referred to as residual information. Primary discrete cosine transform (DCT) is performed on the residual information to obtain a primary transform coefficient, which can be represented by a primary transform coefficient block; and secondary transform is performed on a low-frequency component in a preset region of the primary transform coefficient block to obtain a secondary transform coefficient with more concentrated energy. As shown in FIG. 3, the preset region is located in the upper left corner of the primary transform coefficient block. The secondary transform coefficient may be represented by a secondary transform coefficient block; and low-frequency component in a preset region of the secondary transform coefficient block are quantized and entropy coded to obtain a binary code stream.

In addition, inverse secondary transform may be further performed on the quantized secondary transform coefficient to obtain a primary transform coefficient, and inverse primary transform is performed on the primary transform coefficient to obtain residual information. Further, an addition operation is performed on the residual information and a predicted attribute value to obtain reconstruction information, and loop filtering processing is performed on the reconstruction information to obtain an attribute reconstruction value.

In some specific coding scenarios, the secondary transform and inverse secondary transform are not performed.

Currently, the general point cloud technology standards have the following technical problems:

In an attribute coding process of a point cloud, a correlation between corresponding residual information of to-be-coded points is not fully considered, which leads to presence of part of redundant information in a transform coefficient, resulting in relatively low attribute coding efficiency for the point cloud.

Based on the above, how to implement attribute coding and attribute decoding by fully using the correlation between the corresponding residual information of the to-be-coded points in the point cloud attribute coding and attribute decoding processes is a technical issue to be resolved, so as to improve the efficiency of point cloud attribute coding and point cloud attribute decoding.

The following describes in detail a point cloud attribute coding method provided in the embodiments of this application by using some embodiments and application scenarios thereof with reference to the accompanying drawings.

Figure 4:
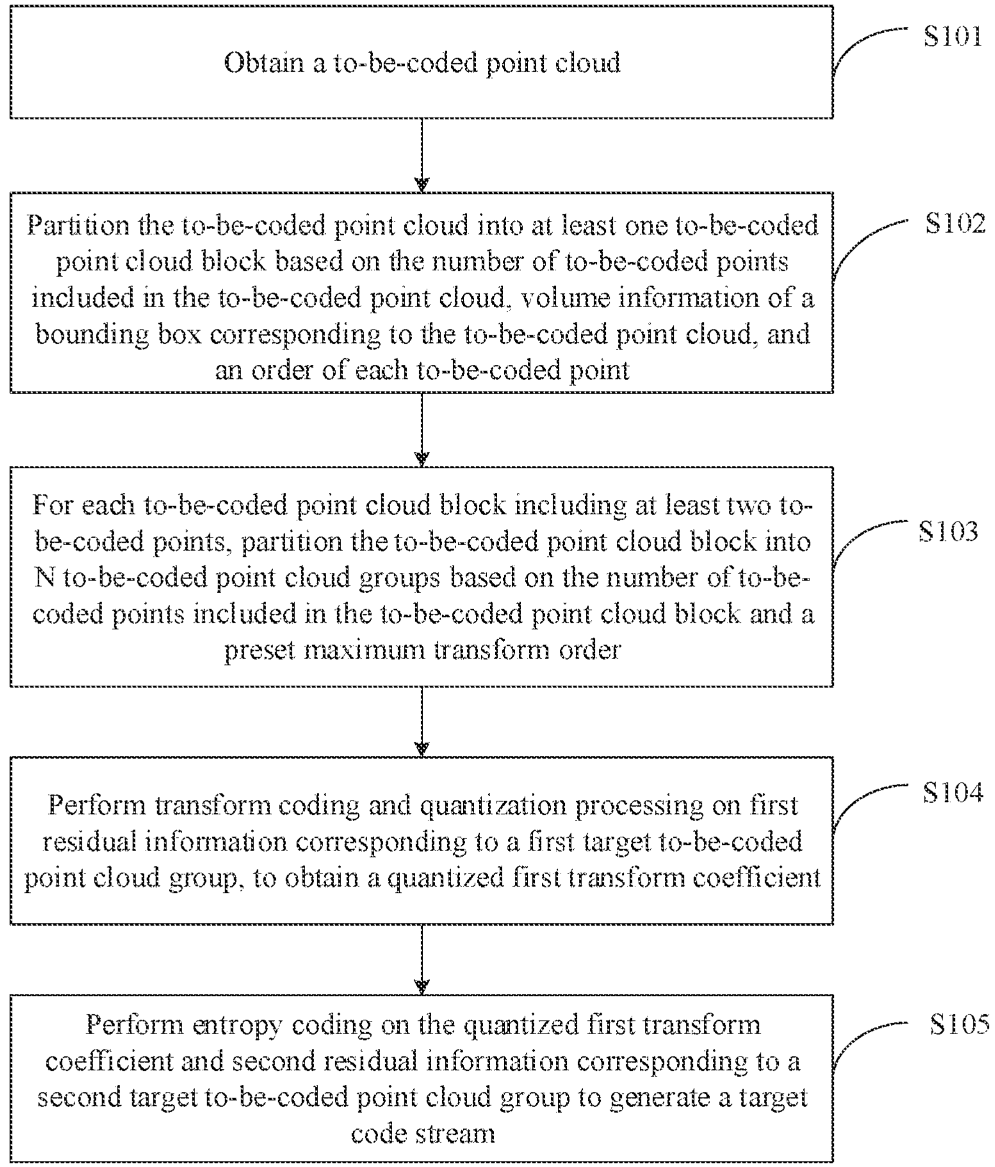
FIG. 4 is a flowchart of a point cloud attribute coding method according to an embodiment of this application.

Referring to FIG. 4, FIG. 4 is a flowchart of a point cloud attribute coding method according to this application. The point cloud attribute coding method provided in this embodiment includes the following steps.

S101: Obtain a to-be-coded point cloud.

The to-be-coded point cloud in this step is a point cloud obtained through recoloring and color space conversion. Recoloring indicates recoloring performed on a geometrically reconstructed point cloud using an original point cloud, so that uncoded attribute information corresponds to reconstructed geometric information to obtain a recolored point cloud; and color space conversion indicates converting color information of the point cloud from RGB space to YUV space.

The to-be-coded point cloud can be understood as a point cloud sequence, and to-be-coded points in the to-be-coded point cloud can be understood as elements in the point cloud sequence. The to-be-coded points in the point cloud sequence are sorted in a preset coding order. An optional implementation is to perform Hilbert sorting on the to-be-coded points in the point cloud sequence to sort the to-be-coded points in descending order of Hilbert code, or to perform Morton sorting on the to-be-coded points in the point cloud sequence to sort the to-be-coded points in ascending order of Morton code.

S102: Partition the to-be-coded point cloud into at least one to-be-coded point cloud block based on the number of to-be-coded points included in the to-be-coded point cloud, volume information of a bounding box corresponding to the to-be-coded point cloud, and an order of each to-be-coded point.

In this step, the to-be-coded point cloud is partitioned to obtain the to-be-coded point cloud block. A manner of partitioning the to-be-coded point cloud may be determined based on the number of to-be-coded points included in the to-be-coded point cloud, volume information of a bounding box corresponding to the to-be-coded point cloud, and the order of each to-be-coded point. For the specific technical solution, refer to the subsequent embodiments.

In an optional implementation, the number of to-be-coded point cloud blocks is 1. In this case, it can be understood that the entire to-be-coded point cloud is considered as one to-be-coded point cloud block.

It should be understood that corresponding attribute information of to-be-coded points that belong to a same to-be-coded point cloud block is spatially correlated, and therefore their corresponding attribute information is more strongly correlated, that is, the to-be-coded points are closer in geometric location and more similar in color attributes.

It should be understood that if the to-be-coded points in the point cloud sequence are sorted in descending order of Hilbert code, the to-be-coded points belonging to the same to-be-coded point cloud block correspond to the same Hilbert code after division is performed on the to-be-coded point cloud.

It should be understood that if the to-be-coded points in the to-be-coded point cloud are sorted in descending order of Morton code, the to-be-coded points belonging to the same to-be-coded point cloud block correspond to the same Morton code after division is performed on the to-be-coded point cloud.

S103: For each to-be-coded point cloud block including at least two to-be-coded points, partition the to-be-coded point cloud block into N to-be-coded point cloud groups based on the number of to-be-coded points included in the to-be-coded point cloud block and a preset maximum transform order.

In this step, after the to-be-coded point cloud is partitioned into at least one to-be-coded point cloud block, for the to-be-coded point cloud block including at least two to-be-coded points, point cloud grouping is performed on the to-be-coded point cloud block to partition the to-be-coded point cloud block into N to-be-coded point cloud groups, N being a positive integer. It should be understood that point cloud grouping on the to-be-coded point cloud block may be performed based on the number of to-be-coded points included in the to-be-coded point cloud block and the preset maximum transform order. For the specific technical solution, refer to the subsequent embodiments.

In a possible case, the number of to-be-coded point cloud groups is 1, and in this case, it can be understood that the entire to-be-coded point cloud block is considered as one to-be-coded point cloud group.

It should be understood that after the to-be-coded point cloud block is partitioned into N to-be-coded point cloud groups, for any to-be-coded point in the to-be-coded point cloud group, nearest neighbors of the to-be-coded point are searched based on a geometric spatial relation, reconstructed attribute values for neighbors found are used to perform prediction on the to-be-coded point to obtain a predicted attribute value, and differential prediction is performed on a true attribute value and the predicted attribute value of the to-be-coded point to obtain a predicted residual. The predicted residual is also referred to as residual information. In this manner, residual information corresponding to each to-be-coded point in each to-be-coded point cloud group is obtained.

S104: Perform transform coding and quantization processing on first residual information corresponding to a first target to-be-coded point cloud group, to obtain a quantized first transform coefficient.

In this step, all to-be-coded point cloud groups in the to-be-coded point cloud block may be determined as the first target to-be-coded point cloud group, or part of the to-be-coded point cloud groups in the to-be-coded point cloud block may be determined as the first target to-be-coded point cloud group. For the specific technical solution on how to determine the target to-be-coded point cloud group, refer to the subsequent embodiments.

As described above, after point cloud grouping is performed on the to-be-coded point cloud block, the residual information corresponding to each to-be-coded point in each to-be-coded point cloud group is determined. In this step, a collection of residual information corresponding to each to-be-coded point in the first target point cloud group may be determined as the residual information corresponding to the first target to-be-coded point cloud group.

For the specific technical solution on how to perform transform coding and quantization processing on the residual information corresponding to the first target to-be-coded point cloud group to obtain the quantized first transform coefficient, refer to subsequent embodiments.

S105: Perform entropy coding on the quantized first transform coefficient and second residual information corresponding to a second target to-be-coded point cloud group to generate a target code stream.

In this step, after the first transform coefficient and the residual information corresponding to the second target to-be-coded point cloud group are obtained, entropy coding is performed on the first transform coefficient and the second residual information to generate the target code stream.

It should be understood that the second target to-be-coded point cloud group is a to-be-coded point cloud group other than the first target to-be-coded point cloud group in the N to-be-coded point cloud groups.

Entropy coding is a coding manner in which no information is lost in the coding process according to the entropy principle, and entropy coding described above may be Shannon coding, Huffman coding, or other types of coding, which is not specifically limited in this embodiment. The target code stream is a binary code stream.

It should be understood that in some embodiments, the inverse quantization and inverse transform operations may be performed on the first transform coefficient to obtain an attribute reconstruction value.

In this embodiment of this application, after the to-be-coded point cloud is obtained, the to-be-coded point cloud is partitioned into at least one to-be-coded point cloud block, and point cloud grouping is performed on the to-be-coded points in each to-be-coded point cloud block to partition the to-be-coded point cloud block into N to-be-coded point cloud groups. In the transform coding process, the correlation between the corresponding residual information of the to-be-coded points is fully considered, and transform coding and quantization processing are performed on the first residual information corresponding to the first target to-be-coded point cloud group to obtain the quantized first transform coefficient, where a correlation is present between the residual information of the to-be-coded points in the first target to-be-coded point cloud group. Further, entropy coding is performed on the quantized first transform coefficient and the second residual information corresponding to the second target to-be-coded point cloud group to generate the target code stream. The correlation between the corresponding residual information of the to-be-coded points is fully considered in the foregoing coding process, and the redundant information in the transform coefficient is reduced through transform coding on the first residual information corresponding to the first target to-be-coded point cloud group, thereby improving the efficiency of point cloud attribute coding.

To facilitate understanding of the technical effects produced in this application, the point cloud attribute coding method provided in the embodiments of this application is applied to a PCEM platform to monitor the attribute coding efficiency of the point cloud. For a specific monitoring result, refer to Table 1.

TABLE 1

| Sequence | BD-AttrRate (Luma) | BD-GeomRate 1 (Chroma Cb) | BD-GeomRate 2 (Chroma Cr) |
|---|---|---|---|
| Sequence 1 | −4.4% | −6.2% | −8.0% |
| Sequence 2 | −4.8% | −2.8% | −3.2% |
| Sequence 3 | −3.3% | −9.9% | −9.3% |
| Sequence 4 | −2.6% | −13.3% | −14.7% |
| Sequence 5 | −2.3% | −10.3% | −9.7% |
| Sequence 6 | −3.4% | −25.2% | −26.6% |
| Sequence 7 | −1.1% | −5.8% | 0.9% |
| Sequence 8 | −21.3% | −54.0% | −62.1% |
| Sequence 9 | −6.3% | −21.3% | −30.9% |
| Sequence 10 | −6.1% | −23.9% | −29.2% |
| Sequence 11 | −6.2% | −18.8% | −23.1% |
| Sequence 12 | −4.9% | −20.8% | −23.9% |

BD-AttrRate in Table 1 represents compression performance of the Y-component in the transform coefficient, BD-GeomRate 1 represents compression performance of the U-component in the transform coefficient, and BD-GeomRate 2 represents compression performance of the V-component in the transform coefficient. The sequences in Table 1 are code stream sequences obtained by comparing the point cloud attribute coding method provided in the embodiments of this application with an existing point cloud attribute coding method. It should be understood that the BD-AttrRate, BD-GeomRate 1, and BD-GeomRate 2 becoming negative indicates that the performance becomes better, and a larger absolute value of BD-rate indicates a larger performance gain.

It can be obtained from Table 1 that the coding performance of point cloud attribute coding can be improved using the point cloud attribute coding method provided in the embodiments of this application.

Optionally, the partitioning the to-be-coded point cloud into at least one to-be-coded point cloud block based on the number of to-be-coded points included in the to-be-coded point cloud and an order of each to-be-coded point includes:

performing shifting on a sorting code corresponding to each to-be-coded point using a first target shift value, to obtain a first target sorting code corresponding to the to-be-coded point; where the target shift value is determined based on the number of to-be-coded points included in the to-be-coded point cloud and the volume information of the bounding box; and grouping to-be-coded points with a same first target sorting code into one to-be-coded point cloud block.

In this embodiment, geometric information of the to-be-coded point cloud is coordinate transformed so that the point cloud is all included in one bounding box. The bounding box may be understood as a hexahedron covering the to-be-coded point cloud, and each edge of the hexahedron is located in the X-axis, Y-axis or Z-axis of the coordinate system described above. A third shift parameter corresponding to the to-be-coded point cloud is determined based on a size of the bounding box, that is, side lengths of the bounding box corresponding to the X-axis, Y-axis and Z-axis of the coordinate system.

The number of to-be-coded points included in the to-be-coded point cloud is obtained, and a fourth shift parameter corresponding to the to-be-coded point cloud is determined based on the number of to-be-coded points included in the to-be-coded point cloud.

A shift calculation formula is further preset in this embodiment, and the third shift parameter and the fourth shift parameter are input into the shift calculation formula to obtain the first target shift value corresponding to the to-becoded point cloud. The side lengths corresponding to the bounding box may be input into the third shift parameter calculation formula to obtain the third shift parameter, and the number of to-be-coded points included in the to-be-coded point cloud may be input into the fourth shift parameter calculation formula to obtain the fourth shift parameter.

Specifically, the foregoing shift calculation formula is consistent with a shift calculation formula in the subsequent point cloud attribute decoding method, the foregoing third shift parameter calculation formula is consistent with a third shift parameter calculation formula in the subsequent point cloud attribute decoding method, and the foregoing fourth shift parameter calculation formula is consistent with a fourth shift parameter calculation formula in the subsequent point cloud attribute decoding method.

The following provides description by using the to-be-coded points in the to-be-coded point cloud being sorted in ascending order of Hilbert code as an example.

As described above, the to-be-coded points in the to-be-coded point cloud are sorted in ascending order of Hilbert code. After the first target shift value is obtained, a Hilbert code corresponding to each to-be-coded point is shifted to the right by using the first target shift value to obtain a new Hilbert code corresponding to each to-be-coded point, and the new Hilbert code is determined as a target Hilbert code, where the target Hilbert code may be understood as a target sorting code. It should be understood that the first target shift value indicates the number of bits moved for the to-be-coded point in the shifting process, and the first target shift value may alternatively indicate a degree of sparseness of the to-be-coded point cloud, and a smaller target shift value indicates denser to-be-coded points in the to-be-coded point cloud.

Further, the to-be-coded point cloud is partitioned according to a target Hilbert code corresponding to each to-be-coded point, and to-be-coded points with the same target Hilbert code are partitioned into the same to-be-coded point cloud block, that is, to-be-coded points in one to-be-coded point cloud block correspond to a same target Hilbert code.

In other embodiments, the first target shift value may be customized, or the first target shift value may be determined based on a geometric quantization step of the to-be-coded point cloud.

In this embodiment, shifting is performed on the Hilbert code of each to-be-coded point in the to-be-coded point cloud, and the to-be-coded point cloud is partitioned into to-be-coded point cloud blocks based on the target Hilbert code corresponding to each to-be-coded point obtained after shifting. The to-be-coded points belonging to the same to-be-coded point cloud block have the same target Hilbert code, so that the attribute information of these points is considered to have a stronger correlation with each other. In this way, to-be-coded points whose attribute information has spatial correlation are partitioned in one to-be-coded point cloud block.

The following specifically describes a specific technical solution of performing point cloud grouping on the to-be-coded point cloud block based on the number of to-be-coded points included in the to-be-coded point cloud block and the preset maximum transform order.

In this embodiment, a maximum transform order is preset, and the foregoing preset maximum transform order is used to indicate the maximum order corresponding to the transform matrix used in the transform coding process. The number of to-be-coded points included in the to-be-coded point cloud block is obtained, and in a case that the number of to-be-coded points is less than or equal to the preset maximum transform order, the to-be-coded point cloud block is determined to be one to-be-coded point cloud group, that is, point cloud grouping is not performed on the to-be-coded point cloud block. The preset maximum transform order may be written into a code stream.

In a case that the number of to-be-coded points is greater than the preset maximum transform order, point cloud grouping is performed on the to-be-coded point cloud block based on the number of to-be-coded points and a first preset value, and the to-be-coded point cloud block is partitioned into at least two to-be-coded point cloud groups. Here, for a specific scheme of point cloud grouping on the to-be-coded point cloud block based on the number of to-be-coded points included in the to-be-coded point cloud block and the first preset value, refer to subsequent embodiments.

Optionally, the partitioning the to-be-coded point cloud block into at least two point cloud groups based on the number of to-be-coded points included in the to-be-coded point cloud block and a first preset value includes:

in a case that a third value is greater than the preset maximum transform order, perform a grouping calculation operation on the third value using the first preset value to obtain a fourth value; and partitioning at least part of the to-be-coded points, for which point cloud grouping has not been performed, into one to-be-coded point cloud group based on a preset coding order of the to-be-coded points in the to-be-coded point cloud block, until point cloud grouping for all to-be-coded points of all to-be-coded point cloud blocks is completed.

The third value is used to indicate the number of to-be-coded points for which point cloud grouping has not been performed in the to-be-coded point cloud block. In a case that the third value is greater than the preset maximum transform order, a grouping computation operation is performed on the third value using the first preset value to obtain the fourth value, where the fourth value is less than the preset maximum transform order. Here, for a specific scheme of how to perform the group calculation operation on the third value using the first preset value to obtain the fourth value, refer to subsequent embodiments.

After the fourth value is obtained, at least part of the to-be-coded points for which point cloud grouping has not been performed are partitioned into one to-be-coded point cloud group based on a preset coding order of the to-be-coded points in the to-be-coded point cloud block. That is, part of the to-be-coded points for which point cloud grouping has not been performed in the to-be-coded point cloud block are determined, and the part of the to-be-coded points are partitioned into one to-be-coded point cloud group, or all of the to-be-coded points for which point cloud grouping has not been performed in the to-be-coded point cloud block are determined and the to-be-coded points are partitioned into one to-be-coded point cloud group. The number of to-be-coded points partitioned into one to-be-coded point cloud group described above is equal to the second value.

After point cloud grouping is performed on part of the to-be-coded points, the third value is updated, and if the updated third value is still greater than the preset maximum transform order, point cloud grouping is further performed on at least part of the to-be-coded points in the to-be-coded point cloud block until point cloud grouping is completed for all of the to-be-coded points in the to-be-coded point cloud block.

The following specifically describes how to perform a grouping calculation operation on the third value using the first preset value to obtain the fourth value.

The grouping calculation operation process is as follows: perform a division operation on the third value and the first preset value to obtain a division result and round the division result to obtain a target value; and in a case that the target value is greater than the preset maximum transform order, update the third value to the target value, continue to perform the division operation on the third value and the first preset value until a target value is less than or equal to the preset maximum transform order, and then determine the target value as the fourth value.

It should be understood that the technical solution for performing point cloud grouping on the to-be-coded point cloud block in this embodiment is consistent with a subsequent technical solution for performing point cloud grouping on a to-be-decoded point cloud block, and details are not described here.

Optionally, before the performing transform coding and quantization processing on first residual information corresponding to a first target to-be-coded point cloud group, to obtain a quantized first transform coefficient, the method includes:

obtaining a first transform flag in the to-be-coded point cloud;

in a case the first transform flag is used to indicate transform coding on all to-be-coded point cloud groups, determining all the to-be-coded point cloud groups as the first target to-be-coded point cloud group; and in a case the first transform flag is used to indicate adaptive transform coding on all the to-be-coded point cloud groups, determining at least one of the N to-be-coded point cloud groups as the first target to-be-coded point cloud group.

It should be understood that the first target to-be-coded point cloud group is a point cloud group for transform coding, that is, each to-be-coded point in the first target to-be-coded point cloud group requires transform coding.

In this embodiment, a first transform flag is preset for the to-be-coded point cloud, where the first transform flag is also referred to as an adaptive transform flag, which may be represented by adaptive transform (AdpTransform), and this first transform flag may be customized.

If AdpTransform=0, it indicates that transform coding is performed on all to-be-coded points, that is, transform coding is performed on all to-be-coded point cloud groups. In this case, the all to-be-coded point cloud groups are determined as the first target to-be-coded point cloud group.

If AdpTransform=1, it indicates that adaptive transform coding is performed on each to-be-coded point cloud group. In this case, whether to perform transform coding on each to-be-coded point cloud group needs to determined based on the actual situation of each to-be-coded point cloud group, that is, determining at least one of the N to-be-coded point cloud groups as the first target to-be-coded point cloud group.

It should be understood that the to-be-coded point cloud groups in the to-be-coded point cloud block are sorted in an order of grouping time of the point cloud groups, and a to-be-coded point cloud group ranking the top in the to-be-coded point cloud block is determined as a third point cloud group.

In this embodiment, a fourth transform flag is preset in the to-be-coded point cloud block, and in a case that the fourth transform flag is used to indicate that the third point cloud group is determined as the first target to-be-coded point cloud group in a case that transform coding is performed on the third point cloud group. That is, the fourth transform flag is preset in the to-be-coded point cloud block, and whether the third point cloud group is the first target to-be-coded point cloud group is determined based on the fourth transform flag.

It should be understood that the to-be-coded point cloud groups in the to-be-coded point cloud block are sorted in an order of grouping time of the point cloud groups, and a to-be-coded point cloud group other than the to-be-coded point cloud group ranking the top in the to-be-coded point cloud block is determined to be a fourth point cloud group. For any one fourth point cloud group, a to-be-coded point cloud group adjacent to the fourth point cloud group and located before the fourth point cloud group in the to-be-coded point cloud block is determined as a neighboring point cloud group, a maximum value in reconstruction information corresponding to the neighboring point cloud group is determined as a third reconstruction value, and a minimum value in the reconstruction information corresponding to the neighboring point cloud group is determined as a fourth reconstruction value.

A difference result between the third reconstruction value and the fourth reconstruction value is calculated, and an absolute value of the difference result is obtained. Further, in this embodiment, a second preset value is further set, and in a case that the absolute value is less than the second preset value, the fourth point cloud group is determined as the first target to-be-coded point cloud group.

Optionally, the performing transform coding and quantization processing on first residual information corresponding to a first target to-be-coded point cloud group, to obtain a quantized first transform coefficient includes:

calculating a product result of a transform matrix and the first residual information, and determining the product result as a to-be-quantized first transform coefficient; and quantizing the to-be-quantized first transform coefficient to obtain the quantized first transform coefficient.

The first residual information is residual information corresponding to the first target to-be-coded point cloud group; as described above, the residual information corresponding to the to-be-coded point cloud group is a collection of residual information corresponding to each to-be-coded point of the to-be-coded group, and the first residual information can be understood as one one-dimensional residual information matrix.

The foregoing transformation matrix may be a discrete cosine transform (DCT) or discrete sine transform (DST) matrix, or a Hadamard transform matrix, or other types of transform matrices. A transform order of the transform matrix is the same as the number of to-be-coded points included in the first target to-be-coded point cloud group. For example, the number of to-be-coded points included in the first target to-be-coded point cloud group is 3; in this case, the transform order of the transform matrix is also 3, and the transform matrix is a 3*3 matrix.

The to-be-quantized first transform coefficient includes a low-frequency coefficient and a high-frequency coefficient. The low-frequency coefficient is also referred to as a DC coefficient, and the high-frequency coefficient is also referred to as an AC coefficient.

The transform matrix is multiplied with the residual information corresponding to the first target to-be-coded point cloud group to obtain the to-be-quantized transform coefficient, for example, referring to the following formula:

$$\begin{bmatrix} DC \\ AC_0 \\ \dots \\ AC_{K-2} \end{bmatrix} = \begin{bmatrix} T_{11} & \dots & T_{1K} \\ \dots & \dots & \dots \\ T_{K1} & \dots & T_{KK} \end{bmatrix} \times \begin{bmatrix} AttrRes_1 \\ AttrRes_2 \\ \dots \\ AttrRes_K \end{bmatrix}$$

DC in the foregoing formula indicates a low-frequency coefficient, AC indicates a high-frequency coefficient, AttrRes indicates first residual information, and T indicates an element in the transform matrix. From the above formula, it can be obtained that if the first target to-be-coded point cloud group includes K to-be-coded points, the first residual information matrix includes K residual information, the to-be-quantized first transform coefficient includes 1 low-frequency coefficient and K−1 high-frequency coefficients, and the transform order of the transform matrix is K.

A color attribute of the to-be-quantized first transform coefficient is a YUV color space; a U-component and a V-component in the YUV color space may be determined as a first component, and a Y-component may be determined as a second component.

High-frequency coefficients in the U-component and the V-component are quantized using a preset first quantization step to obtain a quantized third high-frequency coefficient.

Low-frequency coefficients in the U-component and the V-component are quantized using a preset second quantization step to obtain a quantized third low-frequency coefficient.

The high-frequency coefficient and the low-frequency coefficient in the Y-component are quantized using a preset third quantization step to obtain a quantized fourth high-frequency coefficient and a quantized fourth low-frequency coefficient.

In this embodiment, the quantized third high-frequency coefficient, the quantized third low-frequency coefficient, the quantized fourth high-frequency coefficient, and the quantized fourth low-frequency coefficient are determined as the quantized first transform coefficients.

The following describes in detail a point cloud attribute decoding method provided in the embodiments of this application by using some embodiments and application scenarios thereof with reference to the accompanying drawings.

Figure 5:
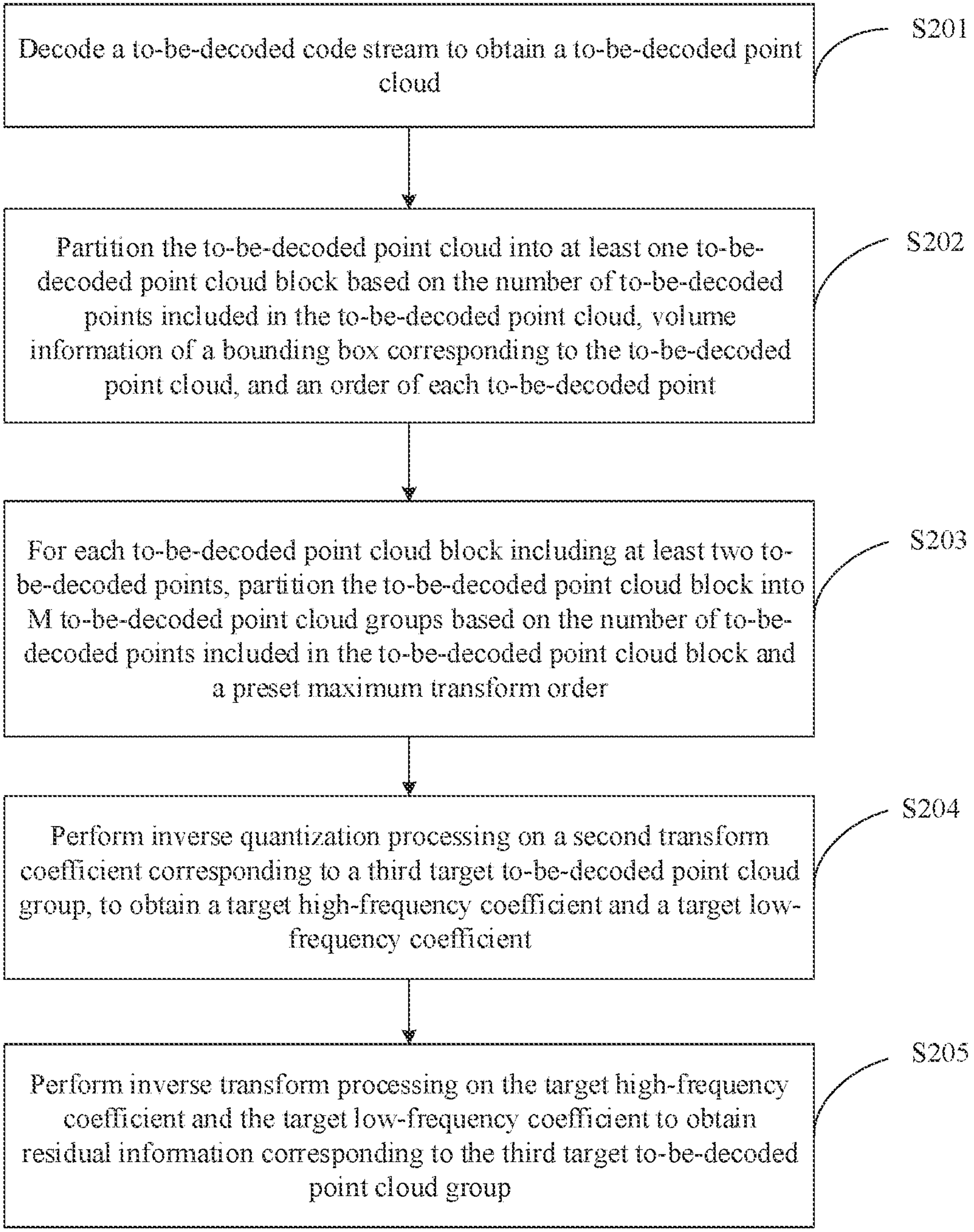
FIG. 5 is a flowchart of a point cloud attribute decoding method according to an embodiment of this application.

Referring to FIG. 5, FIG. 5 is a flowchart of a point cloud attribute decoding method according to this application. The point cloud attribute decoding method provided in this embodiment includes the following steps:

S201: Decode a to-be-decoded code stream to obtain a to-be-decoded point cloud.

In this step, after the to-be-decoded code stream is obtained, the to-be-decoded code stream is decoded to obtain the to-be-decoded point cloud, where the to-be-decoded point cloud includes a plurality of to-be-decoded points, and the to-be-decoded points in the to-be-decoded point cloud are sorted in a preset coding order. The to-be-decoded points of the to-be-decoded point cloud may be sorted in descending order of Hilbert code, or sorted in descending order of Morton code.

S202: Partition the to-be-decoded point cloud into at least one to-be-decoded point cloud block based on the number of to-be-decoded points included in the to-be-decoded point cloud, volume information of a bounding box corresponding to the to-be-decoded point cloud, and an order of each to-be-decoded point.

In this step, the to-be-decoded point cloud is partitioned to obtain the to-be-decoded point cloud block. A manner of partitioning the to-be-decoded point cloud may be determined based on the number of to-be-decoded points included in the to-be-decoded point cloud, volume information of a bounding box corresponding to the to-be-decoded point cloud, and the order of each to-be-decoded point. For the specific technical solution, refer to the subsequent embodiments.

It should be understood that corresponding attribute information of to-be-decoded points that belong to one to-be-decoded point cloud block is spatially correlated, that is, the to-be-decoded points are closer in geometric location and more similar in color attribute.

It should be understood that if the to-be-decoded points in the to-be-decoded point cloud are sorted in descending order of Hilbert code, the to-be-decoded points of the same to-be-decoded point cloud block correspond to the same Hilbert code after division is performed on the to-be-decoded point cloud.

It should be understood that if the to-be-decoded points in the to-be-decoded point cloud are sorted in descending order of Morton code, the to-be-decoded points belonging to the same to-be-decoded point cloud block correspond to the same Morton code after division is performed on the to-be-decoded point cloud.

S203: For each to-be-decoded point cloud block including at least two to-be-decoded points, partition the to-be-decoded point cloud block into M to-be-decoded point cloud groups based on the number of to-be-decoded points included in the to-be-decoded point cloud block and a preset maximum transform order.

In this step, after the to-be-decoded point cloud is partitioned into at least one to-be-decoded point cloud block, for the to-be-decoded point cloud block including at least two to-be-decoded points, point cloud grouping is performed on the to-be-decoded point cloud block, and the to-be-decoded point cloud block is partitioned into M to-be-decoded point cloud groups. Herein, for an implementation of partitioning the to-be-decoded point cloud block into the M to-be-decoded point cloud groups, refer to the embodiments.

In a possible case, the number of to-be-decoded point cloud groups is 1, and in this case, it can be understood that the entire to-be-decoded point cloud block is to be considered as one to-be-decoded point cloud group.

It should be understood that the to-be-decoded point cloud block is partitioned into M to-be-decoded point cloud groups, for any to-be-decoded point in the to-be-decoded point cloud groups, nearest neighbors of the to-be-decoded point are searched based on a geometric spatial relation, reconstructed attribute values for neighbors found are used to perform prediction on the to-be-decoded point to obtain a predicted attribute value, so as to obtain a predicted attribute value corresponding to each to-be-decoded point in each to-be-decoded point cloud group, where the predicted attribute value is also referred to as prediction information.

S204: Perform inverse quantization processing on a second transform coefficient corresponding to a third target to-be-decoded point cloud group, to obtain a target high-frequency coefficient and a target low-frequency coefficient.

The third target to-be-decoded point cloud group is at least part of the M to-be-decoded point cloud groups, and the third target to-be-decoded point cloud group is a to-be-decoded point cloud group for inverse quantization processing.

In this step, at least part of the to-be-decoded point cloud groups in the M to-be-decoded point cloud groups are determined as the third target to-be-decoded point cloud group. It should be understood that the third target to-be-decoded point cloud group is a to-be-decoded point cloud group for inverse quantization processing. For a specific technical solution of how to determine the third target to-be-decoded point cloud group, refer to the subsequent embodiments.

In this step, the second transform coefficient corresponding to the third target to-be-decoded point cloud group is read, and inverse quantization processing is performed on the second transform coefficient, to obtain the target high-frequency coefficient and the target low-frequency coefficient. Here, for the specific implementation of inverse quantization processing, refer to the subsequent embodiments.

S205: Perform inverse transform processing on the target high-frequency coefficient and the target low-frequency coefficient to obtain residual information corresponding to the third target to-be-decoded point cloud group.

In this step, after the target high-frequency coefficient and the target low-frequency coefficient are obtained, inverse transform processing is performed on the target high-frequency coefficient and the target low-frequency coefficient to obtain the residual information corresponding to the third target to-be-decoded point cloud group.

In an optional implementation, a to-be-decoded point cloud group not for inverse quantization processing in the M to-be-decoded point cloud groups may be determined as a fourth target to-be-decoded point cloud group, and inverse quantization processing is performed on the fourth target to-be-decoded point cloud group to obtain residual information corresponding to the fourth target to-be-decoded point cloud group.

As described above, after the to-be-decoded point cloud block is partitioned into M to-be-decoded point cloud groups, for any to-be-decoded point in the to-be-decoded point cloud groups, nearest neighbors of the to-be-decoded point are searched based on a geometric spatial relation, reconstructed attribute values for neighbors found are used to perform prediction on the to-be-decoded point to obtain prediction information corresponding to the to-be-decoded point. Further, after the residual information corresponding to the to-be-decoded point is determined, the residual information corresponding to the to-be-decoded point may be added with the prediction information corresponding to the to-be-decoded point to obtain reconstructed attribute information corresponding to the to-be-decoded point.

In the point cloud attribute decoding method provided in this embodiment of this application, the correlation between the residual information corresponding to the to-be-decoded points is fully considered. The target high-frequency coefficient and target low-frequency coefficient corresponding to the third target to-be-decoded point cloud group are obtained through inverse quantization processing on the second transform coefficient corresponding to the third target to-be-decoded point cloud group, where a spatial correlation is present between the attribute information of the to-be-decoded points in the third target to-be-decoded point cloud group. Further, inverse transform processing is performed on the target high-frequency coefficient and target low-frequency coefficient to obtain the residual information corresponding to the third target to-be-decoded point cloud group, thereby reducing redundant information in the transform coefficient and residual information, thereby improving the efficiency of point cloud attribute decoding.

Optionally, the partitioning the to-be-decoded point cloud into at least one to-be-decoded point cloud block based on the number of to-be-decoded points included in the to-be-decoded point cloud, volume information of a bounding box corresponding to the to-be-decoded point cloud, and an order of each to-be-decoded point includes:

performing shifting on a sorting code corresponding to each to-be-decoded point using a second target shift value, to obtain a second target sorting code corresponding to the to-be-decoded point; and grouping to-be-decoded points with a same second target sorting code into one to-be-decoded point cloud block.

The to-be-decoded points in the to-be-decoded point cloud are sorted in ascending order of sorting code, and the sorting code includes any one of a Hilbert code and a Morton code, that is, the to-be-decoded points in the to-be-decoded point cloud are sorted in ascending order of Hilbert code, or the to-be-decoded points in the to-be-decoded point cloud are sorted in ascending order of Morton code.

The following describes the solution by using the to-be-decoded points in the to-be-decoded point cloud being sorted in ascending order of Morton code as an example.

After the second target shift value is obtained, a Hilbert code corresponding to each to-be-decoded point is shifted to the right by using the second target shift value to obtain a new Hilbert code corresponding to each to-be-decoded point, and the new Hilbert code is determined as a target Hilbert code, where the target Hilbert code may be understood as a second target sorting code.

It should be understood that the second target shift value indicates the number of bits moved for the to-be-decoded point in the shifting process, and the second target shift value may alternatively indicate a degree of sparseness of the to-be-decoded point cloud, and a smaller target shift value indicates denser to-be-decoded points in the to-be-decoded point cloud.

Further, the to-be-decoded point cloud is partitioned according to a target Hilbert code corresponding to each to-be-decoded point, and to-be-decoded points with the same target Hilbert code are partitioned into the same to-be-decoded point cloud block, that is, to-be-decoded points in one to-be-decoded point cloud block correspond to a same target Hilbert code.

In this embodiment, shifting is performed on the sorting code of each to-be-decoded point in the to-be-decoded point cloud, and the to-be-decoded point cloud is partitioned into to-be-decoded point cloud blocks based on the second target sorting code corresponding to each to-be-decoded point obtained after shifting. The to-be-decoded points belonging to the same to-be-decoded point cloud block have a same second target sorting code, indicating that the attribute information of these to-be-decoded points is spatially correlated, so as to partition the to-be-decoded points with spatially correlated attribute information into a same to-be-decoded point cloud block.

Optionally, before the performing shifting on a sorting code corresponding to each to-be-decoded point using a second target shift value, to obtain a second target sorting code corresponding to the to-be-decoded point, the method includes:

- determining the second target shift value based on a first shift parameter and a second shift parameter, or
- determining the second target shift value based on a geometric quantization step corresponding to the to-be-decoded point cloud; or
- determining a preset shift value as the second target shift value; or
- obtaining the second target shift value from the to-be-decoded code stream.

In this embodiment, geometric information of the to-be-decoded point cloud is coordinate transformed so that the point cloud is all included in one bounding box. A three-dimensional right-angle coordinate system may be formed with the to-be-decoded point cloud as the center. The bounding box may be understood as a hexahedron covering the to-be-decoded point cloud, and each edge of the hexahedron is located in the X-axis, Y-axis or Z-axis of the coordinate system. A first shift parameter corresponding to the to-be-decoded point cloud is determined based on a size of the bounding box, that is, side lengths of the bounding box corresponding to the X-axis, Y-axis and Z-axis of the coordinate system.

The number of to-be-decoded points included in the to-be-decoded point cloud is obtained, and a second shift parameter corresponding to the to-be-decoded point cloud is determined based on the number of to-be-decoded points included in the to-be-decoded point cloud.

A shift calculation formula, a first shift parameter calculation formula, and a second shift parameter calculation formula are further preset in this embodiment. The first shift parameter and the second shift parameter are input into the calculation formula to obtain the second target shift value corresponding to the to-be-decoded point cloud. The side lengths corresponding to the bounding box may be input into the first shift parameter calculation formula to obtain the first shift parameter, and the number of to-be-decoded points included in the to-be-decoded point cloud may be input into the second shift parameter calculation formula to obtain the second shift parameter.

Specifically, the shift calculation formula, the first shift parameter calculation formula, and the second shift parameter calculation formula are shown below:

$$shiftBits = \min\left(\max\left(3, 3 * \left(\frac{MaxBits - MinBits}{3} - 2\right)\right), 24\right)$$

$$MaxBits = \log_2 X + \log_2 y + \log_2 z$$

$$MinBits = \log_2 voxelCount$$

shiftBits indicates the second target shift value, MaxBits indicates the first shift parameter, MinBits indicates the second shift parameter, x indicates a side length corresponding to the X-axis of the bounding box in the coordinate system, y indicates a side length corresponding to the Y-axis of the bounding box in the coordinate system, z indicates a side length corresponding to the Z-axis of the bounding box in the coordinate system, and voxelCount indicates the number of to-be-decoded points included in the to-be-decoded point cloud.

For example, in a case that the first shift parameter is 9 and the second shift parameter is 3, the second target shift value is 3.

In an optional implementation, the second target shift value may be determined based on a geometric quantization step of the to-be-decoded point cloud, for example, the second target shift value is set to a value corresponding to the geometric quantization step, or an addition result of the value corresponding to the geometric quantization step and a preset value is used as the second target shift value.

In an optional implementation, the second target shift value may be customized.

In an optional implementation, the second target shift value may be read from the to-be-decoded code stream.

Optionally, the partitioning the to-be-decoded point cloud block into M to-be-decoded point cloud groups based on the number of to-be-decoded points included in the to-be-decoded point cloud block and a preset maximum transform order includes:

in a case that the number of to-be-decoded points included in the to-be-decoded point cloud block is less than or equal to the preset maximum transform order, determining the to-be-decoded point cloud block as one to-be-decoded point cloud group; or in a case that the number of to-be-decoded points included in the to-be-decoded point cloud block is greater than the preset maximum transform order, partitioning the to-be-decoded point cloud block into at least two to-be-decoded point cloud groups based on the number of to-be-decoded points included in the to-be-decoded point cloud block and a first preset value.

In this embodiment, a maximum transform order is preset, and the foregoing preset maximum transform order is used to indicate the maximum order corresponding to the transform matrix used in the inverse transform processing process. The number of to-be-decoded points included in the to-be-decoded point cloud block is obtained, and in a case that the number of to-be-decoded points is less than or equal to the preset maximum transform order, the to-be-decoded point cloud block is determined to be one to-be-decoded point cloud group, that is, point cloud grouping is not performed on the to-be-decoded point cloud block.

In a case that the number of to-be-decoded points is greater than the preset maximum transform order, point cloud grouping is performed on the to-be-decoded point cloud block based on the number of to-be-decoded points and a first preset value, and the to-be-decoded point cloud block is partitioned into at least two to-be-decoded point cloud groups. Here, for a specific scheme of point cloud grouping on the to-be-decoded point cloud block based on the number of to-be-decoded points included in the to-be-decoded point cloud block and the first preset value, refer to subsequent embodiments.

Optionally, the partitioning the to-be-decoded point cloud block into at least two to-be-decoded point cloud groups based on the number of to-be-decoded points included in the to-be-decoded point cloud block and a first preset value includes:

- in a case that a first value is greater than the preset maximum transform order, performing a grouping calculation operation on the first value using the first preset value to obtain a second value; and
- partitioning at least part of the to-be-decoded points, for which point cloud grouping has not been performed, into one to-be-decoded point cloud group based on a preset decoding order of the to-be-decoded points in the to-be-decoded point cloud block, until point cloud grouping for all to-be-decoded points of all to-be-decoded point cloud blocks is completed.

The first value is used to indicate the number of to-be-decoded points for which point cloud grouping has not been performed in the to-be-decoded point cloud block. In a case that the first value is greater than the preset maximum transform order, a grouping computation operation is performed on the first value using the first preset value to obtain the second value, where the second value is less than the preset maximum transform order. Here, for a specific scheme of how to perform the group calculation operation on the first value using the first preset value to obtain the second value, refer to subsequent embodiments.

After the second value is obtained, at least part of the to-be-decoded points for which point cloud grouping has not been performed are partitioned into one to-be-decoded point cloud group based on a preset decoding order of the to-be-decoded points in the to-be-decoded point cloud block. That is, part of the to-be-decoded points for which point cloud grouping has not been performed in the to-be-decoded point cloud block are determined, and the part of the to-be-decoded points are partitioned into one to-be-decoded point cloud group, or all of the to-be-decoded points for which point cloud grouping has not been performed in the to-be-decoded point cloud block are determined and the to-be-decoded points are partitioned into one to-be-decoded point cloud group. The number of to-be-decoded points partitioned into one to-be-decoded point cloud group described above is equal to the second value.

After point cloud grouping is performed on part of the to-be-decoded points, the first value is updated, and if the updated first value is still greater than the preset maximum transform order, point cloud grouping is further performed on at least part of the to-be-decoded points in the to-be-decoded point cloud block until point cloud grouping is completed for all of the to-be-decoded points in the to-be-decoded point cloud block.

Optionally, the performing a grouping calculation operation on the first value using the first preset value to obtain a second value includes:

in a case that the first value is greater than the preset maximum transform order, rounding a division result of the first value and the first preset value to obtain a target value; and updating the first value to the target value until the target value is less than or equal to the preset maximum transform order, and determining the second value to be the target value.

The grouping calculation operation process is as follows: perform a division operation between the first value and the first preset value to obtain a division result; round the division result to obtain the target value, where the division result can be rounded up or down or rounded to a nearest whole number; and in a case that the target value is greater than the preset maximum transform order, update the first value to the target value, continue to perform the division operation on the first value and the first preset value until a target value is less than or equal to the preset maximum transform order, and then determine the target value as the second value.

For the technical solution of partitioning the to-be-decoded point cloud block into point cloud groups, the following provides description by using an example:

A size relation between Mj1 and Kmax is determined, where Mj1 indicates the number of to-be-decoded points for which point cloud grouping has not been performed in the to-be-decoded point cloud block, that is, the first value, and Kmax is equal to the preset maximum transform order.

If Mj1 is greater than Kj, the grouping calculation operation is performed on the first value: $M_j=\lfloor M_{j1}/2 \rfloor$, that is, a result of dividing the first value by 2 is rounded down to obtain a target value, where Mj in the above formula indicates the target value, and the first preset value is 2. It should be understood that in other embodiments, the first preset value may be customized.

In a case that the target value is greater than Kmax, the first value is updated to the target value, and the grouping calculation operation is repeated until the first value is less than or equal to the preset maximum transform order. In this case, the last updated Mj1 is determined to be the second value, and part of the to-be-decoded points are partitioned into one to-be-decoded point cloud group based on a preset decoding order of the to-be-decoded points in the to-be-decoded block, where the number of the part of to-be-decoded points is the same as the second value.

Then, a size relation between Mj2 and Kj is determined, where Mj2 indicates the number of to-be-decoded points for which point cloud grouping has not been performed in the to-be-decoded point cloud block, and because the point cloud grouping has been performed on part of the to-be-decoded points in the above step, the value of Mj2 is equal to a difference between the number of all the to-be-decoded points of the to-be-decoded point cloud block and the last updated Mj1, that is, the value of Mj2 is less than the value of Mj1. If Mj2 is greater than Kj, a grouping calculation operation is performed on Mj2, and based on the calculation result, the to-be-decoded block is partitioned into point cloud groups. The specific implementation is consistent with the foregoing implementation of partitioning the to-be-decoded block into point cloud groups based on Mj1, which is not repeated here.

Until the number of to-be-decoded points for which point cloud grouping has not been performed in the to-be-decoded point cloud block is less than or equal to Kj, point cloud grouping on the to-be-decoded block is stopped.

Further, refer to the following example:

It is assumed that the to-be-decoded point cloud block includes 12 to-be-decoded points for which point cloud grouping has not been performed, the maximum transform order is preset to be 5, and the first preset value is 2.

In this case, a grouping calculation operation is performed on the first value 12 and the first preset value 2 to obtain a target value 6. The target value 6 is greater than the preset maximum transform order 5, and the first value is updated to the target value, that is, the first value is updated to 6. A grouping calculation operation is performed on the updated first value 6 to obtain the target value 3. In this case, when the target value 3 is less than the preset maximum transform order 5, three to-be-decoded points are selected and partitioned into one to-be-decoded point cloud group in a preset decoding order of to-be-decoded points of the to-be-decoded point cloud block.

After one point cloud grouping is performed on the to-be-decoded point cloud block, the first value is updated to 9, and a grouping calculation operation is performed on the first value 9 and the first preset value 2 to obtain a target value 4. The target value 4 is less than the preset maximum transform order 5, and four to-be-decoded points are selected and partitioned into one to-be-decoded point cloud group in the preset decoding order of the to-be-decoded points of the to-be-decoded point cloud block.

After point cloud grouping is performed two times on the to-be-decoded point cloud block, the first value is updated to 5. The first value 5 is equal to the preset maximum transform order 5, and five to-be-decoded points are selected and partitioned into one to-be-decoded point cloud group in the preset decoding order of the to-be-decoded points in the to-be-decoded point cloud block.

In summary, for a to-be-decoded point cloud block including 12 to-be-decoded points for which point cloud grouping has not been performed, the to-be-decoded point cloud block may be partitioned into three point cloud groups, and the number of to-be-decoded points corresponding to the three point cloud groups are 3, 4, and 5, respectively.

Optionally, before the performing inverse quantization processing on a second transform coefficient corresponding to a third target to-be-decoded point cloud group, to obtain a target high-frequency coefficient and a target low-frequency coefficient, the method includes: obtaining a second transform flag in the to-be-decoded point cloud;

in a case the second transform flag is used to indicate inverse transform on all to-be-decoded point cloud groups, determining all the to-be-decoded point cloud groups as the third target to-be-decoded point cloud group; and in a case the second transform flag is used to indicate inverse adaptive transform on all the to-be-decoded point cloud groups, determining at least one of the M to-be-decoded point cloud groups as the third target to-be-decoded point cloud group.

It should be understood that the third target to-be-decoded point cloud group is a point cloud group for inverse transform, that is, each to-be-decoded point in the third target to-be-decoded point cloud group requires inverse transform.

In this embodiment, the second transform flag is preset for the to-be-decoded point cloud, and the second transform flag is also referred to as an adaptive transform flag. Optionally, the second transform flag is a same transform flag as the first transform flag, and the second transform flag may be represented by AdpTransform. It should be understood that the second transform flag may be customized.

If AdpTransform=0, it indicates that inverse transform is performed on all to-be-decoded points; in this case, all to-be-decoded point cloud groups are determined as the third target to-be-decoded point cloud group.

If AdpTransform=1, it indicates that adaptive inverse transform is performed on each to-be-decoded point cloud group. In this case, whether to perform inverse transform on each to-be-decoded point cloud group needs to determined based on the actual situation of the to-be-decoded point cloud group. In this case, at least one of the N to-be-decoded point cloud groups is determined as the target to-be-decoded point cloud group.

Optionally, the determining at least one of the M to-be-decoded point cloud groups as the third target to-be-decoded point cloud group includes:

obtaining a third transform flag corresponding to the first point cloud group; and in a case the third transform flag is used to indicate inverse transform on the first point cloud group, determining the first point cloud group as the third target to-be-decoded point cloud group.

It should be understood that the to-be-decoded point cloud groups in the to-be-decoded point cloud block are sorted in an order of grouping time of the point cloud groups, and a to-be-decoded point cloud group ranking the top in the to-be-decoded point cloud block is determined to be a first point cloud group.

In this embodiment, a third transform flag is preset in the to-be-decoded point cloud block, and in a case that the third transform flag is used to indicate that the first point cloud group is determined as the third target to-be-decoded point cloud group in a case that inverse transform is performed on the first point cloud group. That is, the third transform flag is preset in the to-be-decoded point cloud block, and whether the first point cloud group is the third target to-be-decoded point cloud group is determined based on the third transform flag.

Optionally, the determining at least one of the M to-be-decoded point cloud groups as the third target to-be-decoded point cloud group includes:

for any second point cloud group, determine a first reconstruction value and a second reconstruction value that are corresponding to the second point cloud group;

calculating an absolute value of a difference between the first reconstruction value and the second reconstruction value; and in a case that the absolute value is less than a second preset value, determine the second point cloud group as a third target to-be-decoded point cloud group.

It should be understood that the to-be-decoded point cloud groups in the to-be-decoded point cloud block are sorted in an order of grouping time of the point cloud groups, and a to-be-decoded point cloud group other than the to-be-decoded point cloud group ranking the top in the to-be-decoded point cloud block is determined to be a second point cloud group. For example, the to-be-decoded point cloud block includes three to-be-decoded point cloud groups, and to-be-decoded point cloud groups ranking the second and the third are determined as the second point cloud group.

For any one second point cloud group, a to-be-decoded point cloud group adjacent to the second point cloud group and located before the second point cloud group in the to-be-decoded point cloud block is determined as a neighboring point cloud group, a maximum value in reconstruction information corresponding to the neighboring point cloud group is determined as the first reconstruction value, and a minimum value in the reconstruction information corresponding to the neighboring point cloud group is determined as the second reconstruction value.

It should be understood that the reconstruction information corresponding to the neighboring point cloud group is a collection of corresponding reconstruction information of to-be-decoded points in the neighboring point cloud group. That is, the first reconstruction value is a maximum value of the reconstruction information corresponding to the to-be-decoded points in the neighboring point cloud group, and the second reconstruction value is a minimum value of the reconstruction information corresponding to the to-be-decoded points in the neighboring point cloud group.

A difference result between the first reconstruction value and the second reconstruction value is calculated, and an absolute value of the difference result is obtained. Further, in this embodiment, a second preset value is further set, and in a case that the absolute value is less than the second preset value, the second point cloud group is determined as the third target to-be-decoded point cloud group.

It should be understood that the third transform flag may be represented as transform flag (TransformFlag), and if TransformFlag=1, the to-be-decoded point cloud group is determined as the third target to-be-decoded point cloud group; or if TransformFlag=0, the to-be-decoded point cloud group is not determined as the third target to-be-decoded point cloud group.

For ease of understanding, the following formula may be introduced to further describe the technical solution of this embodiment:

in a case of $|\text{Att Rec}_{max}-\text{Att Rec}_{min}|\geq\text{Threshold}$, TransformFlag−0 is set, and the to-be-decoded point cloud group is not determined as the third target to-be-decoded point cloud group.

AttRecmax indicates a first reconstruction value, AttRecmin indicates a second reconstruction value, and Threshold indicates a second preset value.

In a case of $|\text{Att Rec}_{max}-\text{Att Rec}_{min}|<\text{Threshold}$, TransformFlag=1 is set, and the to-be-decoded point cloud group is determined as the third target to-be-decoded point cloud group.

Optionally, the performing inverse quantization processing on a second transform coefficient corresponding to a third target to-be-decoded point cloud group, to obtain a target high-frequency coefficient and a target low-frequency coefficient includes:

performing inverse quantization on the first high-frequency coefficient and the first low-frequency coefficient using a preset first quantization step and a preset second quantization step, to obtain an inversely-quantized first high-frequency coefficient and an inversely-quantized first low-frequency coefficient;

quantizing the second high-frequency coefficient and the second low-frequency coefficient using a preset third quantization step to obtain an inversely-quantized second high-frequency coefficient and an inversely-quantized second low-frequency coefficient;

determining the inversely-quantized first high-frequency coefficient and the inversely-quantized second high-frequency coefficient as the target high-frequency coefficient; and determining the inversely-quantized first low-frequency coefficient and the inversely-quantized second low-frequency coefficient as the target low-frequency coefficient.

A color attribute of the second transform coefficient is a YUV color space, and a U-component and a V-component in the YUV color space may be determined as a first component, a Y-component is determined as a second component, a high-frequency coefficient in the first component is determined as a first high-frequency coefficient, a low-frequency coefficient in the first component is determined as a first low-frequency coefficient, a high-frequency coefficient in the second component is determined as a second high-frequency coefficient, and a low-frequency coefficient in the second component is determined as a second low-frequency coefficient.

For the first high-frequency coefficient, inverse quantization is performed on the first high-frequency coefficient using the preset first quantization step to obtain an inversely-quantized first high-frequency coefficient. The first quantization step is equal to a sum of an initial step, a transform step, and a high-frequency step, and the initial step, the transform step, and the high-frequency step each may be customized.

It should be understood that the first quantization step may be determined by the following formula:

$$Q_{fin1}=Q_{ori}+\text{Offset}_{coeff}+\text{Offset}_{AC}$$

$Q_{fin1}$ indicates the first quantization step, $Q_{ori}$ indicates the initial step, $\text{Offset}_{coeff}$ indicates the transform step, and $\text{Offset}_{AC}$ indicates the high-frequency step.

For the first low-frequency coefficient, inverse quantization is performed on the first low-frequency coefficient using the preset second quantization step to obtain an inversely-quantized first low-frequency coefficient. The second quantization step is equal to a sum of an initial step, a transform step, and a low-frequency step, and the initial step, the transform step, and the low-frequency step each may be customized.

It should be understood that the second quantization step may be determined by the following formula:

$$Q_{fin2}=Q_{ori}+\text{Offset}_{coeff}+\text{Offset}_{DC}$$

$Q_{fin2}$ indicates the second quantization step, and $\text{Offset}_{DC}$ indicates the low-frequency step.

For the second high-frequency coefficient and the second low-frequency coefficient, inverse quantization is performed on the second high-frequency coefficient and the second low-frequency coefficient using the preset third quantization step, to obtain an inversely-quantized second high-frequency coefficient and an inversely-quantized second low-frequency coefficient. The third quantization step is equal to a sum of the initial step, the transform step, and the low-frequency step, or the third quantization step is equal to a sum of the initial step, the transform step, and the high-frequency step, where the initial step, the transform step, the high-frequency step, and the low-frequency step may be customized, and the high-frequency step and the low-frequency step are the same.

It should be understood that the third quantization step may be determined by the following formula:

$$Q_{fin3}=Q_{ori}+\text{Offset}_{coeff}+\text{Offset}_{DC}$$

$Q_{fin3}$ indicates the third quantization step, and $\text{Offset}_{DC}$ in the foregoing formula may alternatively be replaced with $\text{Offset}_{AC}$.

In this embodiment, the inversely-quantized first high-frequency coefficient and the inversely-quantized second high-frequency coefficient are determined as the target high-frequency coefficient; and the inversely-quantized first low-frequency coefficient and the inversely-quantized second low-frequency coefficient are determined as the target low-frequency coefficient.

It should be noted that for the point cloud attribute coding method provided in the embodiments of this application, the execution body may be an encoder, or a control module for executing the point cloud attribute coding method in the encoder. The encoder provided by the embodiments of this application is described by using the point cloud attribute coding method being executed by the encoder as an example.

Figure 6:
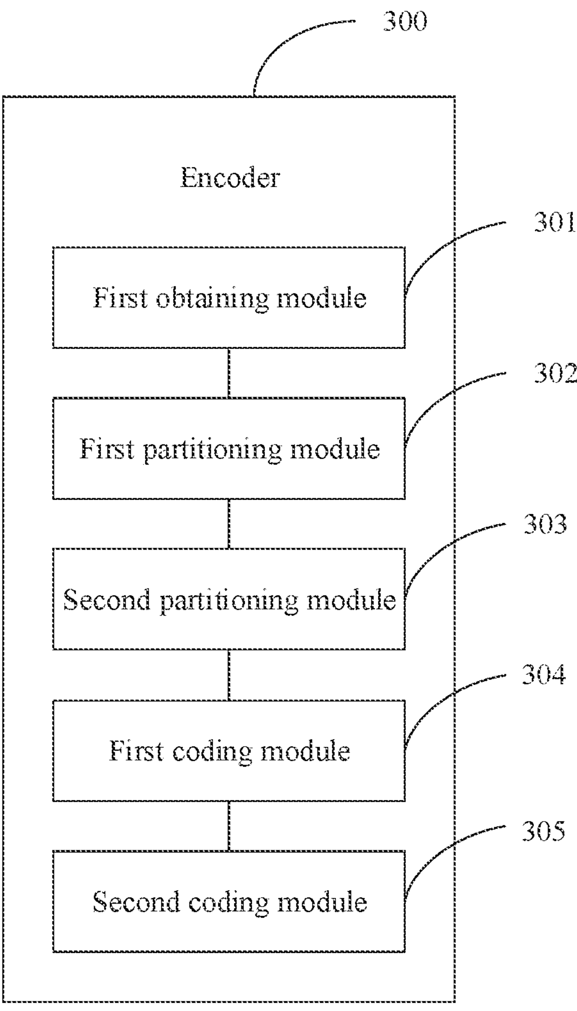
FIG. 6 is a structural diagram of an encoder according to an embodiment of this application.

As shown in FIG. 6, the encoder 300 includes:

a first obtaining module 301, configured to obtain a to-be-coded point cloud;

a first partitioning module 302, configured to partition the to-be-coded point cloud into at least one to-be-coded point cloud block based on the number of to-be-coded points included in the to-be-coded point cloud, volume information of a bounding box corresponding to the to-be-coded point cloud, and an order of each to-be-coded point;

a second partitioning module 303, configured to: for each to-be-coded point cloud block including at least two to-be-coded points, partition the to-be-coded point cloud block into N to-be-coded point cloud groups based on the number of to-be-coded points included in the to-be-coded point cloud block and a preset maximum transform order;

a first coding module 304, configured to: perform transform coding and quantization processing on first residual information corresponding to a first target to-be-coded point cloud group, to obtain a quantized first transform coefficient; and a second coding module 305, configured to: perform entropy coding on the quantized first transform coefficient and second residual information corresponding to a second target to-be-coded point cloud group to generate a target code stream.

Optionally, the first partitioning module 302 is specifically configured to:

perform shifting on a sorting code corresponding to each to-be-coded point using a first target shift value, to obtain a first target sorting code corresponding to the to-be-coded point; and group to-be-coded points with a same first target sorting code into one to-be-coded point cloud block.

Optionally, the second partitioning module 303 is specifically configured to:

in a case that the number of to-be-coded points included in the to-be-coded point cloud block is less than or equal to the preset maximum transform order, determine the to-be-coded point cloud block as one to-be-coded point cloud group; and in a case that the number of to-be-coded points included in the to-be-coded point cloud block is greater than the preset maximum transform order, partition the to-be-coded point cloud block into at least two to-be-coded point cloud groups based on the number of to-be-coded points included in the to-be-coded point cloud block and a first preset value.

Optionally, the encoder 300 further includes:

a second obtaining module, configured to obtain a first transform flag in the to-be-coded point cloud;

a first determining module, configured to: in a case the first transform flag is used to indicate transform coding on all to-be-coded point cloud groups, determine all the to-be-coded point cloud groups as the first target to-be-coded point cloud group; and a second determining module, configured to: in a case the first transform flag is used to indicate adaptive transform coding on all the to-be-coded point cloud groups, determine at least one of the N to-be-coded point cloud groups as the first target to-be-coded point cloud group.

Optionally, the first coding module 304 is specifically configured to:

calculate a product result of a transform matrix and the first residual information, and determine the product result as a to-be-quantized first transform coefficient; and quantize the to-be-quantized first transform coefficient to obtain the quantized first transform coefficient.

The encoder provided in this embodiment of this application is capable of implementing the processes implemented in the method embodiment in FIG. 4, with the same technical effects achieved. To avoid repetition, details are not described herein again.

It should be noted that for the point cloud attribute decoding method provided in the embodiments of this application, the execution body may be a decoder, or a control module for executing the point cloud attribute decoding method in the decoder. The decoder provided by the embodiments of this application is described by using the point cloud attribute decoding method being executed by the decoder as an example.

Figure 7:
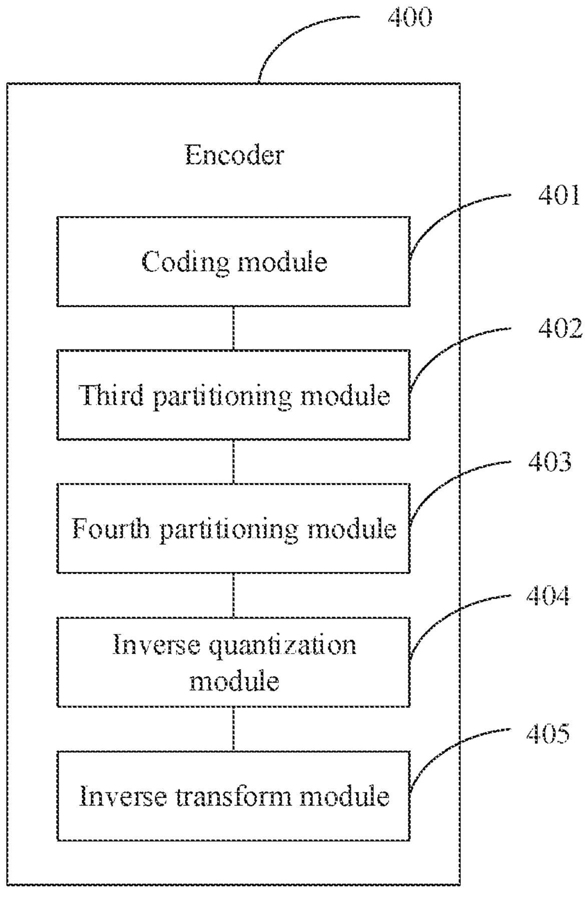
FIG. 7 is a structural diagram of a decoder according to an embodiment of this application.

As shown in FIG. 7, the decoder 400 includes:

a decoding module 401, configured to: decode a to-be-decoded code stream to obtain a to-be-decoded point cloud;

a third partitioning module 402, configured to partition the to-be-decoded point cloud into at least one to-be-decoded point cloud block based on the number of to-be-decoded points included in the to-be-decoded point cloud, volume information of a bounding box corresponding to the to-be-decoded point cloud, and an order of each to-be-decoded point;

a fourth partitioning module 403, configured to: for each to-be-decoded point cloud block including at least two to-be-decoded points, partition the to-be-decoded point cloud block into M to-be-decoded point cloud groups based on the number of to-be-decoded points included in the to-be-decoded point cloud block and a preset maximum transform order;

an inverse quantization module 404, configured to perform inverse quantization processing on a transform coefficient corresponding to a third target to-be-decoded point cloud group, to obtain a target high-frequency coefficient and a target low-frequency coefficient; and an inverse transform module 405, configured to perform inverse transform processing on the target high-frequency coefficient and the target low-frequency coefficient to obtain third residual information corresponding to the target to-be-decoded point cloud group.

Optionally, the third partitioning module 402 is specifically configured to:

perform shifting on a sorting code corresponding to each to-be-decoded point using a second target shift value, to obtain a second target sorting code corresponding to the to-be-decoded point; and group to-be-decoded points with a same second target sorting code into one to-be-decoded point cloud block.

Optionally, the third partitioning module 402 is specifically configured to:

determine the second target shift value based on a first shift parameter and a second shift parameter, or determine the second target shift value based on a geometric quantization step corresponding to the to-be-decoded point cloud; or determine a preset shift value as the second target shift value; or obtain the second target shift value from the to-be-decoded code stream.

Optionally, the fourth partitioning module 403 is specifically configured to:

in a case that the number of to-be-decoded points included in the to-be-decoded point cloud block is less than or equal to the preset maximum transform order, determine the to-be-decoded point cloud block as one to-be-decoded point cloud group; or in a case that the number of to-be-decoded points included in the to-be-decoded point cloud block is greater than the preset maximum transform order, partition the to-be-decoded point cloud block into at least two to-be-decoded point cloud groups based on the number of to-be-decoded points included in the to-be-decoded point cloud block and a first preset value.

Optionally, the fourth partitioning module 403 is specifically configured to:

in a case that a first value is greater than the preset maximum transform order, perform a grouping calculation operation on the first value using the first preset value to obtain a second value; and partition at least part of the to-be-decoded points, for which point cloud grouping has not been performed, into one to-be-decoded point cloud group based on a preset decoding order of the to-be-decoded points in the to-be-decoded point cloud block, until point cloud grouping for all to-be-decoded points of all to-be-decoded point cloud blocks is completed, where the number of the at least part of the to-be-decoded points is equal to the second value.

Optionally, the fourth partitioning module 403 is specifically configured to:

in a case that the first value is greater than the preset maximum transform order, round a division result of the first value and the first preset value to obtain a target value; and update the first value to the target value until the target value is less than or equal to the preset maximum transform order, and determine the second value to be the target value.

Optionally, the decoder 400 further includes:

a third obtaining module, configured to obtain a second transform flag in the to-be-decoded point cloud;

a third determining module, configured to: in a case the second transform flag is used to indicate inverse transform on all to-be-decoded point cloud groups, determine all the to-be-decoded point cloud groups as the third target to-be-decoded point cloud group; and a fourth determining module, configured to: in a case the second transform flag is used to indicate inverse adaptive transform on all the to-be-decoded point cloud groups, determine at least one of the M to-be-decoded point cloud groups as the third target to-be-decoded point cloud group.

Optionally, the third determining module is specifically configured to:

obtain a third transform flag corresponding to the first point cloud group; and in a case the third transform flag is used to indicate inverse transform on the first point cloud group, determine the first point cloud group as the third target to-be-decoded point cloud group.

Optionally, the fourth determining module is specifically configured to:

for any second point cloud group, determine a first reconstruction value and a second reconstruction value that are corresponding to the second point cloud group;

calculate an absolute value of a difference between the first reconstruction value and the second reconstruction value; and in a case that the absolute value is less than a second preset value, determine the second point cloud group as a third target to-be-decoded point cloud group.

Optionally, the inverse quantization module 404 is specifically configured to:

perform inverse quantization on the first high-frequency coefficient and the first low-frequency coefficient using a preset first quantization step and a preset second quantization step, to obtain an inversely-quantized first high-frequency coefficient and an inversely-quantized first low-frequency coefficient;

quantize the second high-frequency coefficient and the second low-frequency coefficient using a preset third quantization step to obtain an inversely-quantized second high-frequency coefficient and an inversely-quantized second low-frequency coefficient;

determine the inversely-quantized first high-frequency coefficient and the inversely-quantized second high-frequency coefficient as the target high-frequency coefficient; and determine the inversely-quantized first low-frequency coefficient and the inversely-quantized second low-frequency coefficient as the target low-frequency coefficient.

In this embodiment of this application, after the to-be-coded point cloud is obtained, the to-be-coded point cloud is partitioned into at least one to-be-coded point cloud block, and point cloud grouping is performed on the to-be-coded points in each to-be-coded point cloud block to partition the to-be-coded point cloud block into N to-be-coded point cloud groups. In the transform coding process, the correlation between the corresponding residual information of the to-be-coded points is fully considered, and transform coding and quantization processing are performed on the first residual information corresponding to the first target to-be-coded point cloud group to obtain the quantized first transform coefficient, where a correlation is present between the residual information of the to-be-coded points in the first target to-be-coded point cloud group. Further, entropy coding is performed on the quantized first transform coefficient and the second residual information corresponding to the second target to-be-coded point cloud group to generate the target code stream. The correlation between the corresponding residual information of the to-be-coded points is fully considered in the foregoing coding process, and the redundant information in the transform coefficient and the residual information is reduced through transform coding on the first residual information corresponding to the first target to-be-coded point cloud group, thereby improving the efficiency of point cloud attribute coding.

The encoder and the decoder in the embodiments of this application may each be an apparatus, or an apparatus or electric device having an operating system, or may be a component, an integrated circuit, or a chip in the terminal. The apparatus or electric device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The encoder provided in this embodiment of this application is capable of implementing the processes implemented in the method embodiment in FIG. 4, with the same technical effects achieved. To avoid repetition, details are not described herein again.

The decoder provided in this embodiment of this application is capable of implementing the processes implemented in the method embodiment in FIG. 5, with the same technical effects achieved. To avoid repetition, details are not described herein again.

Figure 8:
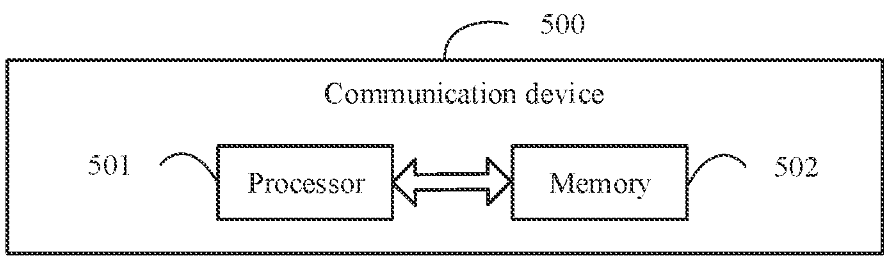
FIG. 8 is a structural diagram of a communication device according to an embodiment of this application.

Optionally, as shown in FIG. 8, an embodiment of this application further provides a communication device 500, including a processor 501, a memory 502, and a program or instructions stored in the memory 502 and capable of running on the processor 501. For example, when the communication device 500 is a terminal and when the program or the instructions are executed by the processor 501, the processes of the foregoing embodiment of the point cloud attribute coding method are implemented or the processes of the foregoing embodiment of the point cloud attribute decoding method are implemented, with the same technical effects achieved.

An embodiment of this application further provides a terminal, including a processor and a communication interface. The processor is configured to perform the following operations:

obtaining a to-be-coded point cloud;

partitioning the to-be-coded point cloud into at least one to-be-coded point cloud block based on the number of to-be-coded points included in the to-be-coded point cloud, volume information of a bounding box corresponding to the to-be-coded point cloud, and an order of each to-be-coded point;

for each to-be-coded point cloud block including at least two to-be-coded points, partitioning the to-be-coded point cloud block into N to-be-coded point cloud groups based on the number of to-be-coded points included in the to-be-coded point cloud block and a preset maximum transform order;

performing transform coding and quantization processing on first residual information corresponding to a first target to-be-coded point cloud group, to obtain a quantized first transform coefficient; and performing entropy coding on the quantized first transform coefficient and second residual information corresponding to a second target to-be-coded point cloud group to generate a target code stream.

Alternatively, the processor is configured to perform the following operations:

decoding a to-be-decoded code stream to obtain a to-be-decoded point cloud;

partitioning the to-be-decoded point cloud into at least one to-be-decoded point cloud block based on the number of to-be-decoded points included in the to-be-decoded point cloud, volume information of a bounding box corresponding to the to-be-decoded point cloud, and an order of each to-be-decoded point;

for each to-be-decoded point cloud block including at least two to-be-decoded points, partitioning the to-be-decoded point cloud block into M to-be-decoded point cloud groups based on the number of to-be-decoded points included in the to-be-decoded point cloud block and a preset maximum transform order; and performing inverse quantization processing on a second transform coefficient corresponding to a third target to-be-decoded point cloud group, to obtain a target high-frequency coefficient and a target low-frequency coefficient; and performing inverse transform processing on the target high-frequency coefficient and the target low-frequency coefficient to obtain residual information corresponding to the third target to-be-decoded point cloud group.

The terminal embodiments correspond to the foregoing terminal-side method embodiments, and the implementation processes and implementations of the foregoing method embodiments can be applied to the terminal embodiments, with the same technical effects achieved. Specifically, FIG. 8 is a schematic diagram of a hardware structure of a terminal for implementing the embodiments of this application.

The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Figure 9:
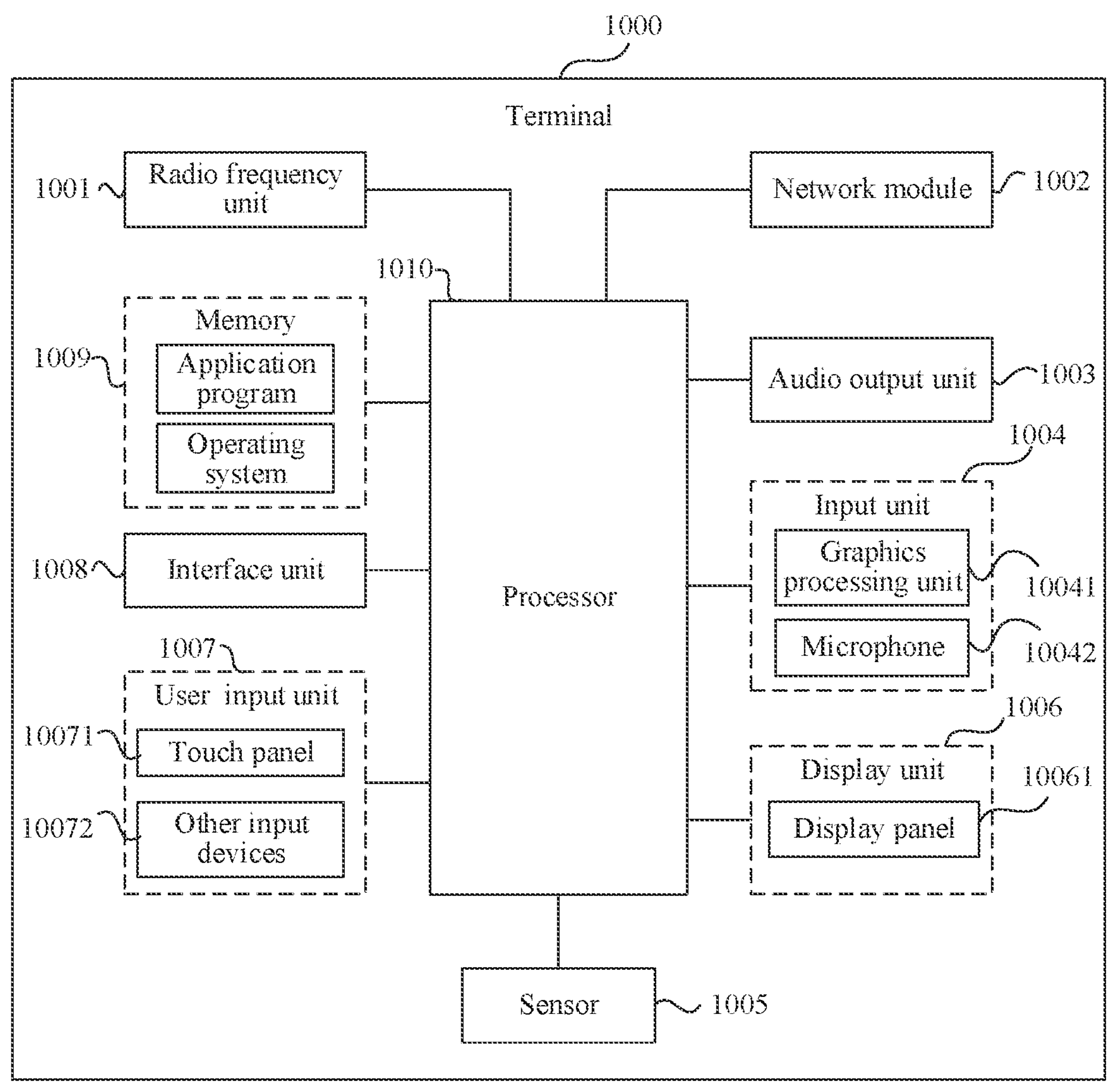
FIG. 9 is a schematic diagram of a hardware structure of a terminal according to an embodiment of this application.

Persons skilled in the art can understand that the terminal 1000 may further include a power supply (for example, a battery) supplying power to the components, and the power supply may be logically connected to the processor 1010 through a power management system. In this way, functions such as charge management, discharge management, and power consumption management are implemented by using the power management system. The structure of the terminal shown in FIG. 9 does not constitute any limitation on the terminal. The terminal may include more or fewer components than shown in the figure, or a combination of some components, or the components disposed differently. Details are not described herein again.

It can be understood that in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, and the like. The user input unit 1007 may include a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, a joystick, and the like. Details are not described herein.

In this embodiment of this application, the radio frequency unit 1001 receives downlink data from a network-side device, and then sends the downlink data to the processor 1010 for processing; and also sends uplink data to the network-side device. Generally, the radio frequency unit 1001 includes but is not limited to an antenna, at least one amplifier, a transceiver, a coupler, a low noise amplifier, a duplexer, and the like.

The memory 1009 may be configured to store software programs or instructions and various data. The memory 1009 may include a program or instruction storage area and a data storage area. The program or instruction storage area may store an operating system, an application program or instruction required by at least one function (for example, a sound playback function or an image playback function), and the like. In addition, the memory 1009 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 1010 may include one or more processing units. Optionally, an application processor and a modem processor may be integrated in the processor 1010. The application processor primarily processes an operating system, user interfaces, application programs or instructions, and the like. The modem processor primarily processes radio communication, for example, being a baseband processor. It can be understood that the modem processor may alternatively be not integrated in the processor 1010.

The processor is configured to perform the following operations:

obtaining a to-be-coded point cloud;

partitioning the to-be-coded point cloud into at least one to-be-coded point cloud block based on the number of to-be-coded points included in the to-be-coded point cloud, volume information of a bounding box corresponding to the to-be-coded point cloud, and an order of each to-be-coded point;

for each to-be-coded point cloud block including at least two to-be-coded points, partitioning the to-be-coded point cloud block into M to-be-coded point cloud groups based on the number of to-be-coded points included in the to-be-coded point cloud block and a preset maximum transform order;

performing transform coding and quantization processing on first residual information corresponding to a first target to-be-coded point cloud group, to obtain a quantized first transform coefficient; and performing entropy coding on the quantized first transform coefficient and second residual information corresponding to a second target to-be-coded point cloud group to generate a target code stream.

Alternatively, the processor is configured to perform the following operations:

decoding a to-be-decoded code stream to obtain a to-be-decoded point cloud;

partitioning the to-be-decoded point cloud into at least one to-be-decoded point cloud block based on the number of to-be-decoded points included in the to-be-decoded point cloud, volume information of a bounding box corresponding to the to-be-decoded point cloud, and an order of each to-be-decoded point;

for each to-be-decoded point cloud block including at least two to-be-decoded points, partitioning the to-be-decoded point cloud block into M to-be-decoded point cloud groups based on the number of to-be-decoded points included in the to-be-decoded point cloud block and a preset maximum transform order; and performing inverse quantization processing on a second transform coefficient corresponding to a third target to-be-decoded point cloud group, to obtain a target high-frequency coefficient and a target low-frequency coefficient; and performing inverse transform processing on the target high-frequency coefficient and the target low-frequency coefficient to obtain residual information corresponding to the third target to-be-decoded point cloud group.

An embodiment of this application further provides a readable storage medium. The readable storage medium may be volatile or non-volatile. A program or instructions are stored in the readable storage medium. When the program or the instructions are executed by a processor, the processes of the foregoing embodiment of the point cloud attribute coding method are implemented or the processes of the foregoing embodiment of the point cloud attribute decoding method are implemented, with the same technical effects achieved. To avoid repetition, details are not described herein again.

An embodiment of this application further provides a computer program product, where the computer program product is stored in a non-transitory storage medium, and when being executed by at least one processor, the computer program product is configured to implement the processes of the foregoing embodiment of the point cloud attribute coding method or the processes of the foregoing embodiment of the point cloud attribute decoding method, with the same technical effects achieved. To avoid repetition, details are not repeated herein.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions to implement the processes of the foregoing embodiment of the point cloud attribute coding method or the processes of the foregoing embodiment of the point cloud attribute decoding method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A point cloud attribute coding method, comprising:

obtaining a to-be-coded point cloud, wherein to-be-coded points in the to-be-coded point cloud are sorted in a preset coding order;

partitioning the to-be-coded point cloud into at least one to-be-coded point cloud block based on the number of to-be-coded points comprised in the to-be-coded point cloud, volume information of a bounding box corresponding to the to-be-coded point cloud, and an order of each to-be-coded point;

for each to-be-coded point cloud block comprising at least two to-be-coded points, partitioning the to-be-coded point cloud block into N to-be-coded point cloud groups based on the number of to-be-coded points comprised in the to-be-coded point cloud block and a preset maximum transform order, N being a positive integer;

performing transform coding and quantization processing on first residual information corresponding to a first target to-be-coded point cloud group, to obtain a quantized first transform coefficient; wherein the first target to-be-coded point cloud group is at least part of the N to-be-coded point cloud groups and the first target to-be-coded point cloud group is a to-be-coded point cloud group for which transform coding is performed; and performing entropy coding on the quantized first transform coefficient and second residual information corresponding to a second target to-be-coded point cloud group to generate a target code stream; wherein the second target to-be-coded point cloud group is a to-be-coded point cloud group in the N to-be-coded point cloud groups other than the first target to-be-coded point cloud group.

2. The method according to claim 1, wherein the to-be-coded points in the to-be-coded point cloud are sorted in ascending order of sorting codes, the sorting code comprising any one of a Hilbert code and a Morton code; and the partitioning the to-be-coded point cloud into at least one to-be-coded point cloud block based on the number of coding points comprised in the to-be-coded point cloud, volume information of a bounding box corresponding to the to-be-coded point cloud, and an order of each coding point comprises:

performing shifting on a sorting code corresponding to each to-be-coded point using a first target shift value, to obtain a first target sorting code corresponding to the to-be-coded point; wherein the target shift value is determined based on the number of to-be-coded points comprised in the to-be-coded point cloud and the volume information of the bounding box; and grouping to-be-coded points with a same first target sorting code into one to-be-coded point cloud block.

3. The method according to claim 1, wherein the partitioning the to-be-coded point cloud block into N to-be-coded point cloud groups based on the number of to-be-coded points comprised in the to-be-coded point cloud block and a preset maximum transform order comprises:

in a case that the number of to-be-coded points comprised in the to-be-coded point cloud block is less than or equal to the preset maximum transform order, determining the to-be-coded point cloud block as one to-be-coded point cloud group; and in a case that the number of to-be-coded points comprised in the to-be-coded point cloud block is greater than the preset maximum transform order, partitioning the to-be-coded point cloud block into at least two to-be-coded point cloud groups based on the number of to-be-coded points comprised in the to-be-coded point cloud block and a first preset value.

4. The method according to claim 1, wherein before the performing transform coding and quantization processing on first residual information corresponding to a first target to-be-coded point cloud group, to obtain a quantized first transform coefficient, the method comprises:

obtaining a first transform flag in the to-be-coded point cloud;

in a case the first transform flag is used to indicate transform coding on all to-be-coded point cloud groups, determining all the to-be-coded point cloud groups as the first target to-be-coded point cloud group; and in a case the first transform flag is used to indicate adaptive transform coding on all the to-be-coded point cloud groups, determining at least one of the N to-be-coded point cloud groups as the first target to-be-coded point cloud group.

5. The method according to claim 1, wherein the performing transform coding and quantization processing on first residual information corresponding to a first target to-be-coded point cloud group, to obtain a quantized first transform coefficient comprises:

calculating a product result of a transform matrix and the first residual information, and determining the product result as a to-be-quantized first transform coefficient; wherein an order of the transform matrix is determined based on the number of to-be-coded points comprised in the first target to-be-coded point cloud group; and quantizing the to-be-quantized first transform coefficient to obtain the quantized first transform coefficient.

6. A point cloud attribute decoding method, comprising:

decoding a to-be-decoded code stream to obtain a to-be-decoded point cloud, wherein to-be-decoded points in the to-be-decoded point cloud are sorted in a preset coding order;

partitioning the to-be-decoded point cloud into at least one to-be-decoded point cloud block based on the number of to-be-decoded points comprised in the to-be-decoded point cloud, volume information of a bounding box corresponding to the to-be-decoded point cloud, and an order of each to-be-decoded point;

for each to-be-decoded point cloud block comprising at least two to-be-decoded points, partitioning the to-be-decoded point cloud block into M to-be-decoded point cloud groups based on the number of to-be-decoded points comprised in the to-be-decoded point cloud block and a preset maximum transform order, M being a positive integer;

performing inverse quantization processing on a second transform coefficient corresponding to a third target to-be-decoded point cloud group, to obtain a target high-frequency coefficient and a target low-frequency coefficient; wherein the third target to-be-decoded point cloud group is at least part of the M to-be-decoded point cloud groups and the third target to-be-decoded point cloud group is a to-be-decoded point cloud group for which inverse quantization processing is performed; and performing inverse transform processing on the target high-frequency coefficient and the target low-frequency coefficient to obtain third residual information corresponding to the third target to-be-decoded point cloud group.

7. The method according to claim 6, wherein the to-be-decoded points in the to-be-decoded point cloud are sorted in ascending order of sorting codes, the sorting code comprising any one of a Hilbert code and a Morton code; and the partitioning the to-be-decoded point cloud into at least one to-be-decoded point cloud block based on the number of to-be-decoded points comprised in the to-be-decoded point cloud, volume information of a bounding box corresponding to the to-be-decoded point cloud, and an order of each to-be-decoded point comprises:

performing shifting on a sorting code corresponding to each to-be-decoded point using a second target shift value, to obtain a second target sorting code corresponding to the to-be-decoded point; wherein the second target shift value is determined based on the number of to-be-decoded points comprised in the to-be-decoded point cloud and the volume information of the bounding box; and grouping to-be-decoded points with a same second target sorting code into one to-be-decoded point cloud block.

8. The method according to claim 7, wherein before the performing shifting on a sorting code corresponding to each to-be-decoded point using a second target shift value, to obtain a second target sorting code corresponding to the to-be-decoded point, the method comprises:

determining the second target shift value based on a first shift parameter and a second shift parameter, wherein the first shift parameter is determined based on the volume information of the bounding box, and the second shift parameter is determined based on the number of to-be-decoded points comprised in the to-be-decoded point cloud; or determining the second target shift value based on a geometric quantization step corresponding to the to-be-decoded point cloud; or determining a preset shift value as the second target shift value; or obtaining the second target shift value from the to-be-decoded code stream.

9. The method according to claim 6, wherein the partitioning the to-be-decoded point cloud block into M to-be-decoded point cloud groups based on the number of to-be-decoded points comprised in the to-be-decoded point cloud block and a preset maximum transform order comprises:

in a case that the number of to-be-decoded points comprised in the to-be-decoded point cloud block is less than or equal to the preset maximum transform order, determining the to-be-decoded point cloud block as one to-be-decoded point cloud group; or in a case that the number of to-be-decoded points comprised in the to-be-decoded point cloud block is greater than the preset maximum transform order, partitioning the to-be-decoded point cloud block into at least two to-be-decoded point cloud groups based on the number of to-be-decoded points comprised in the to-be-decoded point cloud block and a first preset value.

10. The method according to claim 9, wherein the partitioning the to-be-decoded point cloud block into at least two to-be-decoded point cloud groups based on the number of to-be-decoded points comprised in the to-be-decoded point cloud block and a first preset value comprises:

in a case that a first value is greater than the preset maximum transform order, performing a grouping calculation operation on the first value using the first preset value to obtain a second value; wherein the first value indicates the number of to-be-decoded points for which point cloud grouping has not been performed in the to-be-decoded point cloud block, and the second value is less than or equal to the preset maximum transform order; and partitioning at least part of the to-be-decoded points, for which point cloud grouping has not been performed, into one to-be-decoded point cloud group based on a preset decoding order of the to-be-decoded points in the to-be-decoded point cloud block, until point cloud grouping for all to-be-decoded points of all to-be-decoded point cloud blocks is completed, wherein the number of the at least part of the to-be-decoded points is equal to the second value.

11. The method according to claim 10, wherein the performing a grouping calculation operation on the first value using the first preset value to obtain a second value comprises:

in a case that the first value is greater than the preset maximum transform order, rounding a division result of the first value and the first preset value to obtain a target value; and updating the first value to the target value until the target value is less than or equal to the preset maximum transform order, and determining the second value to be the target value.

12. The method according to claim 6, wherein before the performing inverse quantization processing on a second transform coefficient corresponding to a third target to-be-decoded point cloud group, to obtain a target high-frequency coefficient and a target low-frequency coefficient, the method comprises:

obtaining a second transform flag in the to-be-decoded point cloud;

in a case the second transform flag is used to indicate inverse transform on all to-be-decoded point cloud groups, determining all the to-be-decoded point cloud groups as the third target to-be-decoded point cloud group; and in a case the second transform flag is used to indicate inverse adaptive transform on all the to-be-decoded point cloud groups, determining at least one of the M to-be-decoded point cloud groups as the third target to-be-decoded point cloud group.

13. The method according to claim 12, wherein the M to-be-decoded point cloud groups are sorted in a preset order in the to-be-decoded point cloud block, the M to-be-decoded point cloud groups comprise one first point cloud group, and the first point cloud group is a to-be-decoded point cloud group ranking the top in the M to-be-decoded point cloud groups; and the determining at least one of the M to-be-decoded point cloud groups as the third target to-be-decoded point cloud group comprises:

obtaining a third transform flag corresponding to the first point cloud group; and in a case the third transform flag is used to indicate inverse transform on the first point cloud group, determining the first point cloud group as the third target to-be-decoded point cloud group.

14. The method according to claim 12, wherein the M to-be-decoded point cloud groups are sorted in a preset order in the to-be-decoded point cloud block, the M to-be-decoded point cloud groups comprise M−1 second point cloud groups, and the second point cloud group is a to-be-decoded point cloud group in the M to-be-decoded point cloud groups other than the to-be-decoded point cloud group ranking the top; and the determining at least one of the M to-be-decoded point cloud groups as the third target to-be-decoded point cloud group comprises:

for any second point cloud group, determining a first reconstruction value and a second reconstruction value that are corresponding to the second point cloud group; wherein the first reconstruction value is a maximum value in reconstruction information corresponding to neighboring point cloud groups, the second reconstruction value is a minimum value in the reconstruction information corresponding to neighboring point cloud groups, and the neighboring point cloud group is a to-be-decoded point cloud group adjacent to and located before the second point cloud group in the to-be-decoded point cloud block;

calculating an absolute value of a difference between the first reconstruction value and the second reconstruction value; and in a case that the absolute value is less than a second preset value, determining the second point cloud group as a third target to-be-decoded point cloud group.

15. The method according to claim 6, wherein the second transform coefficient comprises a first component and a second component, the first component comprises a first high-frequency coefficient and a first low-frequency coefficient, and the second component comprises a second high-frequency coefficient and a second low-frequency coefficient; and the performing inverse quantization processing on a second transform coefficient corresponding to a third target to-be-decoded point cloud group, to obtain a target high-frequency coefficient and a target low-frequency coefficient comprises:

performing inverse quantization on the first high-frequency coefficient and the first low-frequency coefficient using a preset first quantization step and a preset second quantization step, to obtain an inversely-quantized first high-frequency coefficient and an inversely-quantized first low-frequency coefficient;

quantizing the second high-frequency coefficient and the second low-frequency coefficient using a preset third quantization step to obtain an inversely-quantized second high-frequency coefficient and an inversely-quantized second low-frequency coefficient;

determining the inversely-quantized first high-frequency coefficient and the inversely-quantized second high-frequency coefficient as the target high-frequency coefficient; and determining the inversely-quantized first low-frequency coefficient and the inversely-quantized second low-frequency coefficient as the target low-frequency coefficient.

16. A terminal, comprising a processor, a memory, and a program or instructions stored in the memory and capable of running on the processor, wherein when the program or the instructions are executed by the processor, the steps of the point cloud attribute coding method according to claim 1 are implemented.

17. A terminal, comprising a processor, a memory, and a program or instructions stored in the memory and capable of running on the processor, wherein when the program or the instructions are executed by the processor, following steps are implemented:

decoding a to-be-decoded code stream to obtain a to-be-decoded point cloud, wherein to-be-decoded points in the to-be-decoded point cloud are sorted in a preset coding order;

partitioning the to-be-decoded point cloud into at least one to-be-decoded point cloud block based on the number of to-be-decoded points comprised in the to-be-decoded point cloud, volume information of a bounding box corresponding to the to-be-decoded point cloud, and an order of each to-be-decoded point;

for each to-be-decoded point cloud block comprising at least two to-be-decoded points, partitioning the to-be-decoded point cloud block into M to-be-decoded point cloud groups based on the number of to-be-decoded points comprised in the to-be-decoded point cloud block and a preset maximum transform order, M being a positive integer;

performing inverse quantization processing on a second transform coefficient corresponding to a third target to-be-decoded point cloud group, to obtain a target high-frequency coefficient and a target low-frequency coefficient; wherein the third target to-be-decoded point cloud group is at least part of the M to-be-decoded point cloud groups and the third target to-be-decoded point cloud group is a to-be-decoded point cloud group for which inverse quantization processing is performed; and performing inverse transform processing on the target high-frequency coefficient and the target low-frequency coefficient to obtain third residual information corresponding to the third target to-be-decoded point cloud group.

18. The terminal according to claim 17, wherein the to-be-decoded points in the to-be-decoded point cloud are sorted in ascending order of sorting codes, the sorting code comprising any one of a Hilbert code and a Morton code; and the partitioning the to-be-decoded point cloud into at least one to-be-decoded point cloud block based on the number of to-be-decoded points comprised in the to-be-decoded point cloud, volume information of a bounding box corresponding to the to-be-decoded point cloud, and an order of each to-be-decoded point comprises:

performing shifting on a sorting code corresponding to each to-be-decoded point using a second target shift value, to obtain a second target sorting code corresponding to the to-be-decoded point; wherein the second target shift value is determined based on the number of to-be-decoded points comprised in the to-be-decoded point cloud and the volume information of the bounding box; and grouping to-be-decoded points with a same second target sorting code into one to-be-decoded point cloud block.

19. The terminal according to claim 17, wherein the partitioning the to-be-decoded point cloud block into M to-be-decoded point cloud groups based on the number of to-be-decoded points comprised in the to-be-decoded point cloud block and a preset maximum transform order comprises:

in a case that the number of to-be-decoded points comprised in the to-be-decoded point cloud block is less than or equal to the preset maximum transform order, determining the to-be-decoded point cloud block as one to-be-decoded point cloud group; or in a case that the number of to-be-decoded points comprised in the to-be-decoded point cloud block is greater than the preset maximum transform order, partitioning the to-be-decoded point cloud block into at least two to-be-decoded point cloud groups based on the number of to-be-decoded points comprised in the to-be-decoded point cloud block and a first preset value.

20. The terminal according to claim 17, wherein before the performing inverse quantization processing on a second transform coefficient corresponding to a third target to-be-decoded point cloud group, to obtain a target high-frequency coefficient and a target low-frequency coefficient, the method comprises:

obtaining a second transform flag in the to-be-decoded point cloud;

in a case the second transform flag is used to indicate inverse transform on all to-be-decoded point cloud groups, determining all the to-be-decoded point cloud groups as the third target to-be-decoded point cloud group; and in a case the second transform flag is used to indicate inverse adaptive transform on all the to-be-decoded point cloud groups, determining at least one of the M to-be-decoded point cloud groups as the third target to-be-decoded point cloud group.

* * * * *